(12) United States Patent
Gordon et al.

(10) Patent No.: US 12,530,709 B2
(45) Date of Patent: Jan. 20, 2026

(54) ULTRAVIOLET LIGHT AND MACHINE LEARNING-BASED ASSESSMENT OF FOOD ITEM QUALITY

(71) Applicant: Apeel Technology, Inc., Goleta, CA (US)

(72) Inventors: Benjamin Gordon, Goleta, CA (US); Ohad Michel, Goleta, CA (US); Matthew Kahlscheuer, Goleta, CA (US); Benjamin Flores, Goleta, CA (US); Charles Frazier, Goleta, CA (US); Louis Perez, Goleta, CA (US)

(73) Assignee: Apeel Technology, Inc., Goleta, CA (US)

( * ) Notice: Subject to any disclaimer, the term of this patent is extended or adjusted under 35 U.S.C. 154(b) by 138 days.

(21) Appl. No.: 18/499,544

(22) Filed: Nov. 1, 2023

(65) Prior Publication Data

US 2024/0062265 A1    Feb. 22, 2024

Related U.S. Application Data

(63) Continuation of application No. 18/131,532, filed on Apr. 6, 2023, now Pat. No. 11,847,681.
(Continued)

(51) Int. Cl.
*G06Q 30/00* (2023.01)
*G06N 20/00* (2019.01)
*G06Q 30/0601* (2023.01)

(52) U.S. Cl.
CPC ......... *G06Q 30/0627* (2013.01); *G06N 20/00* (2019.01)

(58) Field of Classification Search
CPC .............................................. G06Q 30/06–08
See application file for complete search history.

(56) References Cited

U.S. PATENT DOCUMENTS 9,174,245 B2 * 11/2015 Blanc .................... B07C 5/3422
10,986,789 B1 * 4/2021 Roberts .................... A01G 9/26
(Continued)

FOREIGN PATENT DOCUMENTS

WO    WO 2020/073037    4/2020
WO    WO 2020/231784    11/2020
(Continued)

OTHER PUBLICATIONS

Delia Lorente et al: "Selection of Optimal Wavelength Features for Decay Detection in Citrus Fruit Using the ROC Curve and Neural Networks", Food and Bioprocess Technology ; An International Journal, Springer-Verlag, New York, vol. 6, No. 2, Dec. 2, 2011, pp. 530-541 (Year: 2011).*
(Continued)

*Primary Examiner* — Ethan D Civan
(74) *Attorney, Agent, or Firm* — Fish & Richardson P.C.

(57) ABSTRACT

The disclosed technology provides for determining infection in food items using image data of the food items under ultra-violet (UV) light. A method includes performing object detection on the image data to identify a bounding box around each of the food items in the image data, determining, for each food item, an infection presence metric by applying a model to the bounding box, the model being trained using image training data of other food items under UV light, the image training data being annotated based on previous identifications of a first portion of the other food items having infection features and a second portion having healthy quality features, and determining, based on a determination that the infection presence metric for each of the food items indicates presence of an infection, an infection coverage metric for the food item.

20 Claims, 12 Drawing Sheets

Related U.S. Application Data

(60) Provisional application No. 63/328,052, filed on Apr. 6, 2022.

(56) References Cited

U.S. PATENT DOCUMENTS

| | | | |
|---|---|---|---|
| 11,847,681 | B2 | 12/2023 | Gordon et al. |
| 2009/0303233 | A1 | 12/2009 | Lin et al. |
| 2017/0203987 | A1 | 7/2017 | McMahon et al. |
| 2018/0365820 | A1 | 12/2018 | Nipe et al. |
| 2019/0340749 | A1 | 11/2019 | Schwartzer et al. |
| 2020/0222949 | A1 | 7/2020 | Murad et al. |
| 2020/0334628 | A1 | 10/2020 | Goldberg et al. |
| 2020/0380274 | A1 | 12/2020 | Shin et al. |
| 2021/0333185 | A1 | 10/2021 | Hayward et al. |
| 2022/0126315 | A1 | 4/2022 | Ross et al. |
| 2022/0270269 | A1 | 8/2022 | Pattison et al. |
| 2022/0270298 | A1 | 8/2022 | Pattison |
| 2022/0299493 | A1 | 9/2022 | Pattison et al. |
| 2022/0327685 | A1 | 10/2022 | Rogers et al. |
| 2023/0103922 | A1 | 4/2023 | Keech et al. |
| 2023/0214982 | A1 | 7/2023 | Michel et al. |
| 2023/0222822 | A1 | 7/2023 | Jefferson et al. |

FOREIGN PATENT DOCUMENTS

| | | | |
|---|---|---|---|
| WO | WO-2020231784 A1 * | 11/2020 | ............ G01N 21/33 |
| WO | WO 2021/222261 | 11/2021 | |
| WO | WO 2021/252369 | 12/2021 | |

OTHER PUBLICATIONS

Blasco et al., "Citrus sorting by identification of the most common defects using multispectral computer vision," J. Food Eng., Dec. 2007, 83(3):384-393.

Blasco et al., "Recognition and classification of external skin damage in citrus fruits using multispectral data and morphological features," Biosystems Eng., Jun. 2009, 103(2):137-145.

Bosabalidis et al., "Ultrastructural studies on the secretory cavities of Citrus deliciosa ten. II. Development of the essential oil-accumulating central space of the gland and process of active secretion," Protoplasma, Feb. 1982, 112:63-70.

Brodrick, "Investigations into blemishes on citrus fruits—Part III. The development of early and late injuries in relation to rind oils," South African Citrus J., Sep. 1970, 441:19-25.

Cahoon et al., "Cause and control of oleocellosis on lemons," Proc. Amer. Soc. Hort. Sci., Jun. 1964, 84:188-198, 12 pages.

Chhajed et al., "Glucosinolate Biosynthesis and the Glucosinolate-Myrosinase System in Plant Defense," Agronomy, Nov. 2020, 10(11), 1786:25 pages.

Durand-Petiteville et al., "Real-time segmentation of strawberry flesh and calyx from images of singulated strawberries during postharvest processing," Computers and Electronics in Agriculture, Nov. 2017, 142(PA):298-313.

Eaks, "Rind disorders of oranges and lemons in California," Proc. First Intl. Citrus Symp., Nov. 1969, 3:1343-1354, 14 pages.

Fawcett, "A spotting of citrus fruits due to the action of oil liberated from the rind," California Agr. Expt. Sta. Bul., Feb. 1916, 266:261-269, 12 pages.

Fito et al., "Control of citrus surface drying by image analysis of infrared thermography," Journal of Food Engineering, Feb. 2004, 61(3):287-290.

Ganapathy et al., "Smart Marketing Systems for Fruits using Wireless Sensors," 2018 IEEE International Conference on System, Computation, Automation and Networking, Jul. 2018, 4 pages.

Gomez-Sanchis et al., "Detecting rottenness caused by *Penicillium* genus fungi in citrus fruits using machine learning techniques," Expert Systems with Applications, Jan. 2012, 39(1):780-785.

Gowen et al., "Applications of thermal imaging in food quality and safety assessment," Trends in Food Science & Technology, Apr. 2010, 21(4):190-200.

Halbersberg et al., "Transfer Learning of Photometric Pheno-Types in Agriculture Using Metadata," Apr. 2020, retrieved from URL <https://arxiv.org/pdf/2004.00303.pdf>, 6 pages.

Huang et al., "Using Fuzzy Mask R-CNN Model to Automatically Identify Tomato Ripeness," IEEE Access, Nov. 2020, 8(16):207672-207682.

International Search Report and Written Opinion in International Appln. No. PCT/US2023/017702, mailed Jul. 19, 2023, 17 pages.

Lorente et al., "Selection of Optimal Wavelength Features for Decay Detection in Citrus Fruit Using the ROC Curve and Neural Networks," Food and Bioprocess Technology, Dec. 2011, 6(2):530-541.

Obenland et al., "Essential Oils and Chilling Injury in Lemon," HortScience, Feb. 1997, 32(1):108-111.

Obenland et al., "Peel Fluorescence as a Means to Identify Freeze-damaged Navel Oranges," HortTechnology, Jan. 2009, 19(2):379-384.

Obenland et al., "Ultraviolet Fluorescence to Identify Navel Oranges with Poor Peel Quality and Decay," HortTechnology, Dec. 2010, 20(6):991-995.

Overby et al., "Allyl isothiocyanate depletes glutathione and upregulates expression of glutathione S-transferases in *Arabidopsis thaliana*," Front. Plant Sci., Apr. 2015, 6(277):1-9.

Petracek et al., "Physiological peel disorders," Fresh citrus fruits, Wardowski et al. (eds.), Florida Science Source, 2006, 397-419, 25 pages.

Shomer, "Sites of production and accumulation of essential oils in citrus fruits," Electron Microscopy, Proceedings of the Seventh European Congress on Electron Microscopy, Aug. 1980, 2:256-257, 4 pages.

Swift, "TLC-Spectrophotometric Analysis for Neutral Fraction Flavones in Orange Peel Juice," J. Agr. Food Chem., Jan.-Feb. 1967, 15(1):99-101.

U.S. Department of Agriculture, "United States Standards for Grades of Oranges (California and Arizona)," Dec. 27, 1999, available on or before Oct. 29, 2010, via Internet Archive: Wayback Machine URL <https://web.archive.org/web/20100307113825/http://www.ams.usda.gov/AMSv1.0/getfile?dDocName=STELPRDC5050380>, retrieved on Aug. 7, 2023, URL <http://www.ams.usda.gov/AMSv1.0/getfile?dDocName=STELPRDC5050380>, 9 pages.

Wang et al., "Study of Drying Uniformity in Pulsed Spouted Microwave-Vacuum Drying of Stem Lettuce Slices with Regard to Product Quality," Drying Technology, Jan. 2013, 31(1-4):91-101.

Xiaping Fu et al., "Detection of Early Bruises on Pears Using Fluorescence Hyperspectral Imaging Technique," Food Analytical Methods, Aug. 2021, 15(1):115-123.

\* cited by examiner

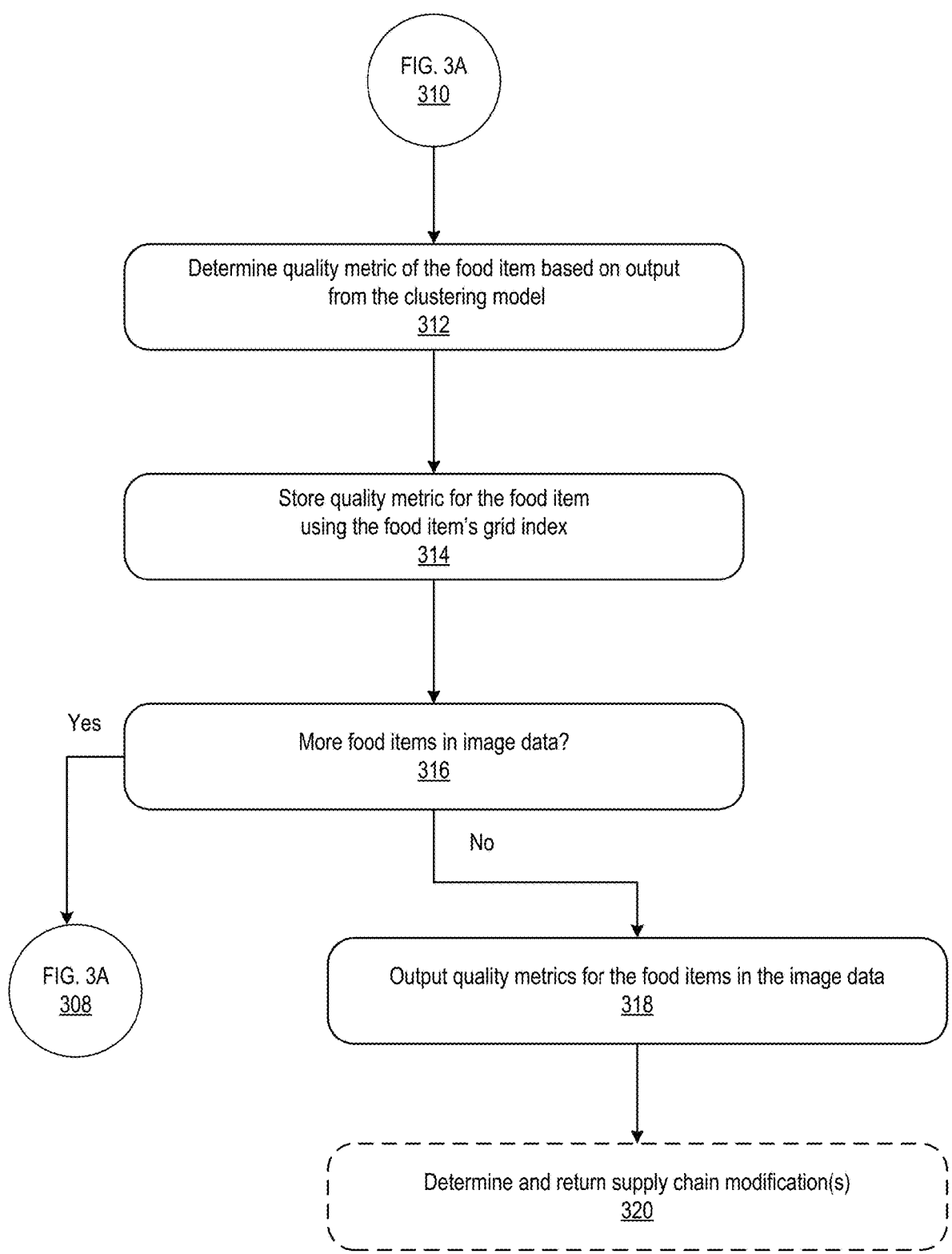

ULTRAVIOLET LIGHT AND MACHINE LEARNING-BASED ASSESSMENT OF FOOD ITEM QUALITY

CROSS-REFERENCE TO RELATED APPLICATIONS

This application is a continuation of U.S. patent application Ser. No. 18/131,532, filed Apr. 6, 2023, which claims the benefit under 35 U.S.C. § 119(e) of U.S. Patent Application No. 63/328,052, entitled "ULTRAVIOLET LIGHT AND MACHINE LEARNING-BASED ASSESSMENT OF FOOD ITEM QUALITY", filed Apr. 6, 2022, both of which are incorporated herein by reference in their entirety.

TECHNICAL FIELD

This document describes devices, systems, and methods related to determining quality of food items based on, for example, image data of the food items.

BACKGROUND

Food items, such as produce, fruits, and meats, can have different quality metrics that can impact their suitability for consumption and value in a supply chain. Multiple different stakeholders throughout the supply chain have an interest in evaluating quality metrics of such food items. As an example, food item color can be an indicator of quality that can be used to sort and grade the food item. Different quality metrics can also impact consumer purchasing decisions.

Food items with quality metrics, such as good color properties, can be more valuable than food items with off-colors or other poor quality metrics. Color and other quality metrics can be used to indicate ripeness, firmness, infection, rotting, desiccation, flavor, sweetness, and tartness features of food items. Any of these features can be valuable throughout the supply chain and in consumer consumption decisions. For example, browning in a food item can indicate rot or infection. With early identification of the browning color, supply chain modifications can be made to avoid wasting the food item.

Objectively and quantitatively defining high quality food items based on image data of the food items in the visible light spectrum can be challenging. Relevant stakeholders in the supply chain can observe and compare colors or features that are visible in or on the food items. However, the human eye may only be able to distinguish color differences or other feature differences in extreme cases or where the color differences or other feature differences are noticeably apparent. For example, the human eye may be able to distinguish when a lime is yellow, green, or brown or when a lime is more yellow than other limes, but the human eye may not be able to identify more subtle changes in color. As another example, it is challenging for the human eye to rank and compare colors universally across all possible colors that a particular food item may obtain during its lifetime. Subtle changes in color and other features throughout the lifetime of the food item can be representative of changes in quality of that food item.

SUMMARY

The document generally describes systems, methods, and techniques for non-invasively assessing quality of food items (e.g., vegetables, fruit, meat) based on, for example, image data. More specifically, the disclosed technology provides for assessing the quality of the food items from image data that is captured with or under ultraviolet (UV) light conditions. Sometimes, features of the food items indicative of quality (e.g., subtle changes in color, an area surrounding a bruise or rot or other infection, etc.) may not be readily discernible in the visible light spectrum. UV light can cause latent infections, such as bruises, rot, desiccation, mold, etc. to fluoresce. Since the latent infections appear more visible in UV light, image data can be captured of the food items in UV light conditions. The image data can include images (e.g., RGB, hyperspectral, multispectral, etc.) as well as additional metadata. As an illustrative example, the disclosed technology can be used to assess food item color to determine food item quality, such as infection presence, ripeness, readiness for consumption, mold, rotting, desiccation, etc. The disclosed technology can distinguish color differences, whether readily apparent or subtle, to assist in determining one or more different quality metrics for the food items.

For example, the disclosed technology can identify presence of infection in a citrus fruit (e.g., an orange, lime, lemon, etc.), how much surface area of the citrus fruit is covered by the infection, a current level of edibility of the citrus fruit based on the infection presence, and a predicted length of time that the citrus fruit remains edible. The disclosed technology can make such determinations for a single food item and/or a batch of food items of a same food type. At least one model can be trained with machine learning techniques, such as k-means clustering, to determine the abovementioned quality metrics for the food items. The at least one model can also be trained to identify various other quality metrics (e.g., shelf life, ripeness, rot, mold, desiccation, bruising, mold, etc.) for various other types of food items (e.g., avocados, apples, berries, mangos, cucumbers, bell peppers, etc.). As a result, food items' quality can be assessed, especially where the human eye may not be able to provide objective and universal quantification or may not be able to distinguish subtle changes in the food items, such as bruising, infection, age, ripeness, taste, etc., or other non-visible features of the food item's quality. Moreover, different types of infection (e.g., latent infection, wound infection) have different fluorescent signatures. Each of these unique signatures can be identified using models trained by machine learning techniques (e.g., k-means clustering) to identify such types of infections with high accuracy and high throughput. Based on the detected infections, the disclosed technology can also determine and predict shelf life of the food items and/or length of time of edibility for the food items so that appropriate supply chain modifications can be made to eliminate or reduce waste of the food items.

The disclosed technology can provide for generating different metrics that can be used to identify different features of the food item that indicate quality of such food items. Quality metrics can be defined per food item. Quality metrics can further be defined per type of food item. For example, apples can have a different color metric, and corresponding machine learning trained model(s) to identify infection or other quality metrics/features, in comparison to limes, avocados, oranges, lemons, limes, and other fruits and produce.

The disclosed technology can be used to determine presence of infection in food items. Based on the determined infection presence, modifications can be made to the supply chain early on. For example, a quality assessment as described throughout this disclosure can be performed once a food item enters a storage facility. Quality of the food item can be assessed at this point in time, which can be a significant indicator of how long the food item may be edible or consumable (even if the food item has some presence of infection). If the food item's quality is identified as poor (e.g., the food item has an amount of infection that exceeds some threshold healthy level), then the supply chain can be modified to immediately ship the food item to consumers at a nearest geographic location (e.g., if the disclosed technology determines that the food item is still consumable for some amount of time), to discard the food item, or to ship the food item to a food processing plant. If the food item's quality is identified as good (e.g., the food item has no infection or an amount of infection that is less than the threshold healthy level), then the supply chain can be modified to store the food item for some period of time or transport the food item to consumers at a farther away geographic location. One or more other supply chain modifications can be determined based on preferences of relevant stakeholders throughout the supply chain lifecycle and determined quality metrics of the produce.

One or more embodiments described herein can include a method for determining infection in food items using image data, the method including: receiving, by a computing system and from an imaging device, image data of food items under ultra-violet (UV) light, performing, by the computing system, object detection on the image data to identify a bounding box around each of the food items in the image data, determining, by the computing system and based on the bounding box around each of the food items in the image data, a grid structure for the image data, each bounding box being assigned a grid index in the grid structure, the grid index being used to identify the food item in a data store, determining, by the computing system and for each of the food items, an infection presence metric for the food item by applying a model to the bounding box portions of the image data, the model having been trained using image training data of other food items under UV light, the image training data being annotated based on previous identifications of a first portion of the other food items as having infection features and a second portion of the other food items as having healthy quality features, the other food items being of a same food type as the food items, determining, by the computing system and based on a determination that the infection presence metric for each of the food items indicates presence of an infection, an infection coverage metric for the food item, and returning, by the computing system, and for each of the food items, (i) the bounding box portions of the image data that contains the food items, (ii) the grid index, (iii) the infection presence metric for the food item, and (iv) the infection coverage metric for the food item.

In some implementations, the embodiments described herein can optionally include one or more of the following features. For example, the infection coverage metric for the food item can be a percentage of a surface of the food item that includes features indicative of the infection. The food items in the image data can include at least one of citrons, mandarins, pomelos, oranges, grapefruits, lemons, limes, and tangerines. The infection presence metric can be a string value indicating a healthy food item or an infected food item.

The method can also include identifying, by the computing system, a group of the food items in the image data as having respective infection presence metrics that satisfy a threshold infection level, the threshold infection level indicating that the food items are infected, determining, by the computing system, an edibility metric for the group of food items by applying an edibility model to the image data, the edibility model having been trained using training time series image data of infected food items, the training time series image data being annotated with previous identifications of infection surface coverage correlating to lengths of time of edibility of the infected food items, the infected food items being of the same food type as the food items, and returning, by the computing system, the edibility metric for the group of food items. The edibility metric can indicate whether the group of food items is edible. Determining, by the computing system, an edibility metric for the group of food items can include predicting a length of time of edibility for the group of food items. The edibility metric can indicate the length of time of edibility for the group of food items.

As another example, the model was trained, by the computing system, using a process including: receiving the image training data of the other food items, performing object detection on the image training data to identify a training bounding box around a food item, identifying healthy features, infected features, and background features of the food item in the bounding box, mapping the identified features into multi-color space, and training the model using a clustering algorithm to determine the infection presence metric for the food item based on the identified features mapped into the multi-color space. The clustering algorithm can be k-means. In some implementations, the method can include transmitting, by the computing system to a user computing device for display in a graphical user interface (GUI), the infection presence metric for each of the food items in the image data.

The method can also include retrieving, by the computing system, from the data store, and for each of the food items, the infection presence metric for the food item, identifying, by the computing system, supply chain information for the food item that includes a preexisting supply chain schedule and destination for the food item, determining, by the computing system, whether to modify the supply chain information for the food item based on the infection presence metric, in response to a determination to modify the supply chain information, generating, by the computing system, modified supply chain information based on the infection presence metric, the modified supply chain information including one or more of a modified supply chain schedule and modified destination for the food item, and transmitting, by the computing system, the modified supply chain information to one or more supply chain actors to implement the modified supply chain information. Determining, by the computing system, whether to modify the supply chain information for the food item based on the infection presence metric can include determining that the infection presence metric satisfies a threshold infection level, the threshold infection level indicating that the food item is infected rather than healthy. The modified supply chain information can include instructions that, when executed by the one or more supply chain actors, cause the food item to be moved for outbound shipment to end-consumers that are geographically closest to a location of the food item. The modified supply chain information can include instructions that, when executed by the one or more supply chain actors, cause at least one of (i) the food item to be moved for outbound shipment to a food processing plant or (ii) a change in controlled atmospheric conditions surrounding the food item.

As another example, the image data can include at least one of RGB images, hyperspectral images, multispectral images, nuclear magnetic resonance (NMR) images, and magnetic resonance images (MRIs). Moreover, determining, by the computing system and for each of the food items, an infection presence metric for the food item comprises determining that the food item is infected based on an infection coverage of the food item exceeding a threshold infection coverage. The method can also include determining that the food item is healthy based on the infection coverage of the food item being less than the threshold infection coverage.

In some implementations, determining, by the computing system and based on a determination that the infection presence metric for each of the food items indicates presence of an infection, an infection coverage metric for the food item can include: summing pixels in the image data that represent healthy features of the food item and unhealthy features of the food item, dividing a quantity of pixels in the image data that represent the unhealthy features of the food item by the summed pixels to generate an infection coverage value, and multiplying the infection coverage value by a predetermined factor to generate a percentage value as the infection coverage metric.

One or more embodiments described herein can include a system for determining infection presence in food items using image data, the system including: at least one light source that can illuminate food items of a same food type, the at least one light source emitting ultra-violet (UV) light, one or more imaging devices that can capture image data for the food items when the food items are illuminated by the at least one light source, and at least one computing system in communication with the one or more imaging devices, the at least one computing system being configured to: receive, from the one or more imaging devices, the image data of the food items under UV light, perform object detection on the image data to identify a bounding box around each of the food items in the image data, determine, based on the bounding box around each of the food items in the image data, a grid structure for the image data, where each bounding box is assigned a grid index in the grid structure, the grid index being used to identify the food item in a data store, determine, for each of the food items, an infection presence metric for the food item by applying a model to the bounding box portions of the image data, the model having been trained using image training data of other food items under UV light, the image training data being annotated based on previous identifications of a first portion of the other food items as having infection features and a second portion of the other food items as having healthy quality features, the other food items being of a same food type as the food items, determine, based on a determination that the infection presence metric for each of the food items indicates presence of an infection, an infection coverage metric for the food item, and return, and for each of the food items, (i) the bounding box portions of the image data that contains the food items, (ii) the grid index, (iii) the infection presence metric for the food item, and (iv) the infection coverage metric for the food item.

The system can optionally include one or more of the following features. For example, the at least one light source can be a UV LED light. The at least one light source can be a black light. The at least one light source can be a UV flood light. The at least one light source can emit UV light having a wavelength within a range of approximately 300 nm-400 nm. The infection coverage metric for the food item can be a percentage of a surface of the food item that includes features indicative of the infection. The food items in the image data can include at least one of citrons, mandarins, pomelos, oranges, grapefruits, lemons, limes, and tangerines.

In some implementations, the at least one computing system can also: identify a group of the food items the food items in the image data as having respective infection presence metrics that satisfy a threshold infection level, the threshold infection level indicating that the food items are infected, determine an edibility metric for the group of food items by applying an edibility model to the image data, the edibility model having been trained using training time series image data of infected food items, the training time series image data being annotated with previous identifications of infection surface coverage correlating to lengths of time of edibility of the infected food items, the infected food items being of the same food type as the food items, and return the edibility metric for the group of food items. The image data can be time series image data of the group of the food items.

As another example, the at least one computing system can determine, based on a determination that the infection presence metric for each of the food items indicates presence of an infection, an infection coverage metric for the food item based on: summing pixels in the image data that represent healthy features of the food item and unhealthy features of the food item, dividing a quantity of pixels in the image data that represent the unhealthy features of the food item by the summed pixels to generate an infection coverage value, and multiplying the infection coverage value by a predetermined factor to generate a percentage value as the infection coverage metric.

One or more embodiments described herein can include a method for determining infection presence in food items using image data, the method including: receiving, by a computing system and from an imaging device, image data of food items under UV light, determining, by the computing system, an infection presence metric for the food items by applying a model to the image data, the model having been trained using image training data of other food items under UV light, the image training data being annotated based on previous identifications of a first portion of the other food items as having infection features and a second portion of the other food items as having healthy quality features, the other food items being of a same food type as the food items, and returning, by the computing system, the infection presence metric for the food items in the image data.

The method can optionally include one or more of the following features. For example, the method can include determining, by the computing system and based on the infection presence metric indicating presence of an infection, an infection coverage metric for the food items, and returning, by the computing system, the infection coverage metric for the food items in the image data. In some implementations, returning, by the computing system, the infection presence metric for the food items in the image data can include transmitting the infection presence metric and the infection coverage metric to a user device for presentation in a GUI display at the user device.

The devices, system, and techniques described herein may provide one or more of the following advantages. For example, the disclosed technology can provide for accurately assessing quality features of food items that may not be readily detectable in the visible light spectrum, either through image data or with the human eye. Therefore, image data of the food items can be captured in UV light conditions. The UV light can cause latent infections, such as bruises, rot, desiccation, mold, etc. to fluoresce. Since the latent infections appear more visible in UV light, the image data captured in such conditions can be used to more accurately assess food item quality than in other lighting conditions.

Moreover, using machine learning trained models, food item quality can be more accurately determined from subtle differences that appear in image data captured in UV light conditions. The human eye may be prone to error in trying to observe subtle changes in appearance of food items and cannot detect non-visible features of the food items, such as latent or wound infections. For example, the human eye may not be able to notice a slight discoloration on a portion of an orange surrounding a mold spot, which can indicate early signs of rot or other poor quality features, such as a shortened length of time for edibility/consumption. Moreover, human workers would have to be trained to visually measure color and quality of food items in a quantitative way. This can be a tedious, time-consuming process and may be subject to human bias. The disclosed technology provides for automatically and accurately detecting different quality features in a food item from a high quality labeled and/or unlabeled image dataset(s). The disclosed technology provides for analyzing quality of food items beyond just the visible spectrum and colors, all of which may be challenging or impossible for the human eye to observe and analyze. The disclosed technology therefore can provide for deeper analysis, increasing efficiency and reducing human error that may occur from observing visual features of food items.

As another example, the disclosed technology can be used to make appropriate supply chain modifications early enough in the supply chain lifecycle to reduce food item-based waste. Food item quality can be assessed at any point throughout the supply chain. For example, quality can be assessed before the food item is shipped from farm to storage facility. Quality can also be assessed once the food item arrives at the storage facility. In some implementations, quality can even be assessed once on shelves at a grocery store and available to consumers. When food item quality is assessed early in the supply chain lifecycle, the food item can be more appropriately sorted based on the identified and/or projected quality of such food item. For example, a food item that is identified as being good quality (e.g., no latent or wound infection) upon entering a storage facility can be stored for a longer period of time in the facility than a food item that is identified as being poor quality (e.g., having some quantity of latent or wound infection). Improved decisions can also be made about how and when to treat food items. For example, if one or more food items are determined to not satisfy a threshold level of quality (e.g., they have a threshold quantity of infection presence), then the disclosed technology can determine that an appropriate supply chain modification is to initiate application of antimicrobial treatment to the food items. Consumption and edibility timeframes can also be determined using the disclosed technology, which can impact when food items are delivered to grocery stores, for how long the food items remain in storage, and whether the food items should be delivered to food processing plants instead of grocery stores.

As described throughout, the disclosed technology can generate robust quality assessments of food items. Different models can be generated and trained using machine learning techniques with high quality labeled training datasets to identify and score different quality features associated with different food items. Such robust quality assessments can be advantageous to more accurately monitor the food item quality and modify the supply chain accordingly to reduce or otherwise eliminate food item-based waste.

As yet another example, the disclosed technology provides for assessing quality of food items in a nondestructive way. Since models are trained to analyze quality characteristics of food items from image data under UV light conditions, humans may not have to perform destructive techniques such as puncturing or pressing on the skin, surface, or flesh of food items to determine their quality. As a result, food items that are delivered to end consumers may be accurately tested and assessed for quality without actually reducing the quality of such food items. The models are therefore trained to extract quality features from image data of the food items instead of requiring a human to destroy or otherwise alter the food items before they are delivered to consumers. Higher quality food items can be delivered to consumers and food items may not go to waste when the disclosed techniques are used for assessing food item quality.

The details of one or more implementations are set forth in the accompanying drawings and the description below. Other features and advantages will be apparent from the description and drawings, and from the claims.

BRIEF DESCRIPTION OF THE DRAWINGS

FIGS. 3A-B is a flowchart of a process for determining quality of a food item based on image data.

Like reference symbols in the various drawings indicate like elements.

DETAILED DESCRIPTION OF ILLUSTRATIVE EMBODIMENTS

This document generally relates to technology for assessing quality of one or more food items from image data that is captured in UV light conditions. UV light conditions can reveal damage, infection, or other poor/unhealthy quality features in food items that may not be as visible or apparent in visible light conditions. UV-A induced fluorescence, such as light having a wavelength within a range of 300 nm to 400 nm, can make unhealthy quality features in the food items fluoresce, therefore more visible for accurate quality assessment of such food items. The disclosed technology can provide for obtaining image data of one or more food items in UV light conditions and determining, based on an evaluation of the image data, a quality metric for each of the food items represented in the image data. Models can be trained using machine learning techniques to process the image data and determine the quality metric. The quality metric can include presence of an infection in the food item. Based on a determined presence of infection, the disclosed technology can also provide for determining shelf life of the food item, a length of time that the food item is edible (even if the food item has presence of an infection), and other quality metrics. One or more additional or other quality metrics can also be modeled and determined based on food item and/or food item type and using the image data of the food items in UV light conditions. Moreover, the disclosed technology can provide for modifying one or more supply chain operations based on quality assessments of the food items in an effort to mitigate losses that may arise from food items having a level of quality that fails to satisfy certain thresholds.

Figure 1A:
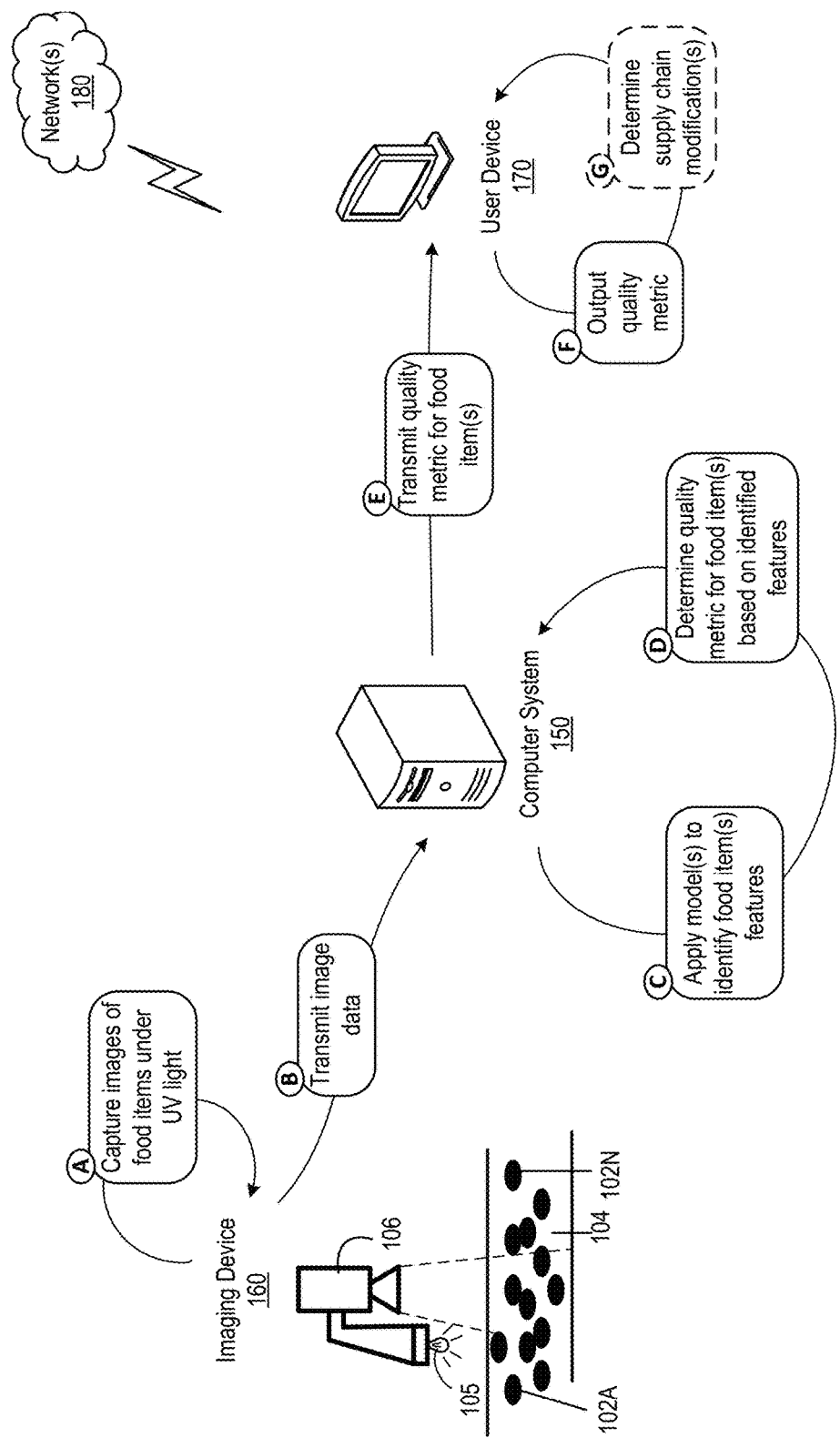
FIG. 1A is a conceptual diagram of determining food item quality based on image data in ultraviolet (UV) lighting.

Referring to the figures, FIG. 1A is a conceptual diagram of determining food item quality based on image data in ultraviolet (UV) lighting. A computer system 150, imaging device 160, and user device 170 can be in communication (e.g., wired and/or wireless) via network(s) 180. The computer system 150 can be configured to assess quality of imaged food items, such as produce, as described throughout this disclosure (e.g., refer to FIGS. 1C, 6). The imaging device 160 can include an image sensor 106. The imaging device 160 can be a camera that captures still images, time series, and/or video data. The imaging device 160 can be an RGB camera that captures mostly light in the visible range. Any other cameras can be used that are designed to capture visible light, including but not limited to the cameras of mobile devices (e.g., smart phone cameras, tablet cameras, laptop cameras, computer cameras, etc.) and professional or nonprofessional cameras (e.g., DSLR cameras). UV-fluorescence imaging can be used with the disclosed techniques, with emitted light peaking around a wavelength of approximately 520 nm. The imaging device 160 can be used in an automatic mode to capture images of the food items 102A-N in the UV light conditions. The imaging device 160 can also be manually set for low light settings. For example, the imaging device 160's shutter speed can be ⅛, its aperture can be set to F/3.5, and it's ISO can be set to 6400. One or more other camera settings can be used to capture images of the food items 102A-N in the UV light conditions described throughout this disclosure.

Figure 1B:
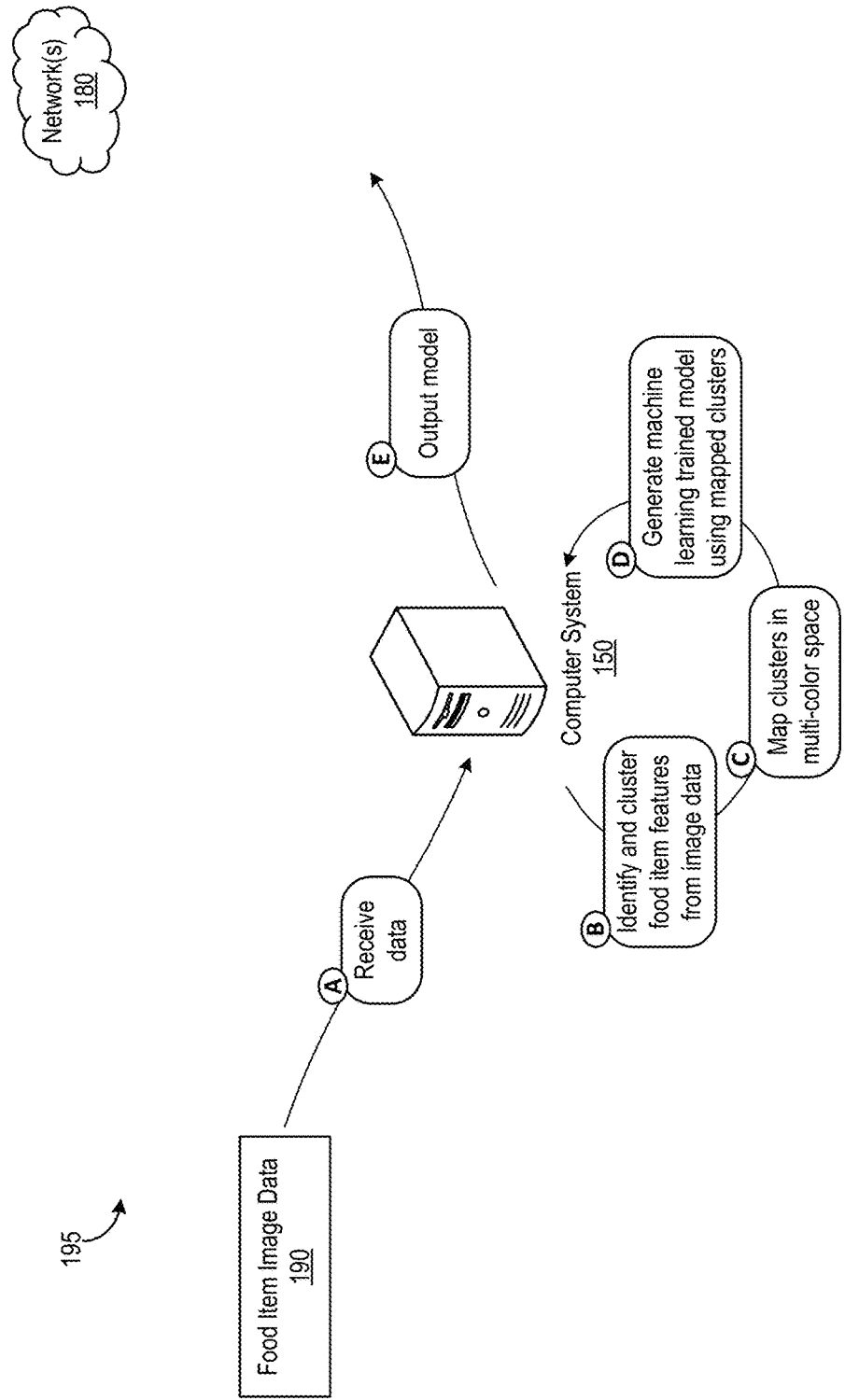
FIG. 1B is a conceptual diagram of generating a model to determine quality of a food item.
Figure 1C:
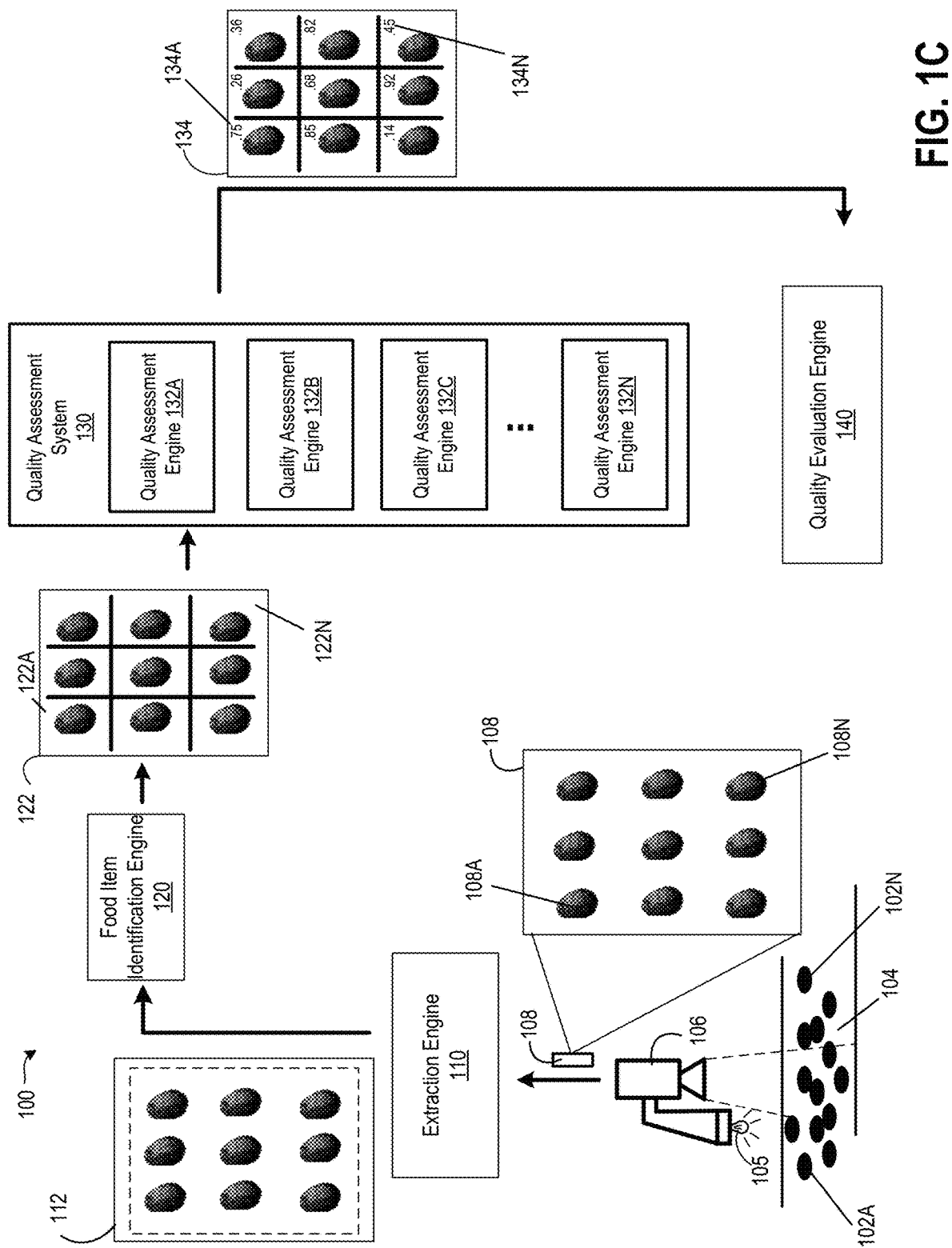
FIG. 1C is a diagram of an example system for assessing quality of one or more food items based on image data.

At least one light source 105 can also be configured to or in communication with the imaging device 160 (e.g., refer to FIG. 1C). In some implementations, the light source 105 can be separate from the imaging device 160. The light source 105 can be positioned near the imaging device 160 to provide uniform lighting on an area in which the imaging device 160 is to capture images of food items 102A-N.

The light source 105 can be a UV-emitting light source. For example, the light source 105 can emit light having a wavelength within a range of 300 nm to 400 nm. As other non-limiting example, the light source 105 can be a UV-B light source, which emits light having a wavelength within a range of approximately 200 nm to 350 nm (e.g., 280 nm to 315 nm). As another example, the light source 105 can be a UV-A light source that emits light having a wavelength within a range of approximately 300 nm to 420 nm (e.g., 315 nm to 400 nm). The light source 105 can also emit light having a wavelength within one or more other non-limiting example ranges that include, but are not limited to, 500 nm to 555 nm, 520 nm to 570 nm, and 420 nm to 620 nm. In some implementations, for example, the light source 105 can emit light having a wavelength of 365 nm. In some implementations, the light source 105 can be a UV LED light, a UV LED black light, high performance LED bulbs, and/or UV flood lights. For example, the light source 105 can be an LED UV light of up to 50 W. The light source 105 can also be an LED UV light as low as 4 W, which can be used in combination with an imaging device that is set to manual or other particular camera settings for picking up fluorescent signals from the food items 102A-N. Multiple light sources 105 can also be positioned around the imaging device 160 to provide uniform lighting conditions. As described herein, the UV light interacts with surface of the food items 102A-N and induces fluorescence (in the visible light range). The output of the imaging device 160 can be a regular RGB image of how the food items 102A-N appear under illumination from UV light (which makes some defects, such as infection, salient).

In some implementations, one or more narrow bandpass filters can be used between the UV light source 105 and the food items 102A-N being illuminated. Such filters can help reduce visible light emission and target specific excitation wavelength(s). These filters, for example, can target 285 nm, 330 nm, 365 nm, 395 nm, or 400 nm, as well as any other wavelengths of interest. The narrow bandpass filter(s) can also be used between the food items 102A-N being illuminated and the imaging device 160 so that only light emitted by fluorophore of the food items 102A-N (e.g., fluorescent chemical compound emitted by the food items 102A-N under UV light conditions) is captured. These filters can also target wavelengths between 400 nm to 780 nm, and can specifically target 520 nm to help in accurately capturing images of the food items 102A-N as infections in the food items 102A-N are fluoresced in the UV light conditions. The imaging device 160 and the light source 105 can be positioned in various locations along a supply chain of the food items 102A-N. For example, the imaging device 160 and the light source 105 can be placed in a warehouse or other storage facility along a conveyor belt 104 system that transports the food items 102A-N to various locations in the warehouse. The imaging device 160 and the light source 105 can also be positioned in a closed environment that receives the food items 102A-N (e.g., a batch, pallet, or flat of the food items 102A-N), such as a photo box, such that uniform lighting and environmental conditions allow for accurate and uniform images to be captured, as described in Application No. 63/295,172, entitled MACHINE LEARNING-BASED ASSESSMENT OF FOOD ITEM QUALITY, herein incorporated by reference in its entirety. The photo box, for example, can be a closed unit that eliminates illumination from light sources other than the light source 105 (such as ambient light). Imaging done with the photo box can be advantageous to determine risk of spoilage over a given timeframe for a batch of the food items 102A-N placed therein. Moreover, two or more images can be captured of the food items 102A-N inside the photo box to capture an entire surface of the food items 102A-N. As a result, the disclosed technology can be applied to the multiple images of the food items 102A-N to determine an overall infection presence across a total surface of each of the food items 102A-N, not just one side of the food items 102A-N.

In some implementations, a section of the conveyor belt 104 having the imaging device 160 and the light source 105 can be covered in materials or some type of enclosure, like the photo box, to avoid penetration of visible light. For example, two sets of rubber-style flaps or other materials can be positioned at an entrance and exit point of the enclosure around the section of the conveyor belt 104. Rollers of the conveyor belt 104 can be activated while the food items 102A-N are inside the enclosure such that the food items 102A-N complete one full rotation by the time they are routed out of the enclosure by the moving conveyor belt 104. By rotating the food items 102A-N while inside the enclosure, an entire surface of the food items 102A-N can be imaged. The disclosed technology can be used with such images to determine infection presence across the entire surface of each of the food items 102A-N.

Using the enclosure, images of the food items 102A-N can be captured in the covered portion of the conveyor belt 104 without penetration of visible light. Wherever images are being captured by the imaging device 160, an interior surface of the enclosure or the photo box described above can also be coated with a material to limit reflectance, since reflectance can interfere with the fluorescent signal captured in the images by the imaging device 160. Materials used in building/constructing the enclosure or photo box can be selected so that they do not fluoresce at the excitation wavelength(s) of the light emitted by the light source 105.

In some implementations, the imaging device 160 can be a handheld device, such as a mobile phone or tablet, that can be used by a human user to capture images of food items 102A-N. The light source 105 can be affixed to the imaging device 160 so that when the handheld device is moved across/over the food items 102A-N, the light source 105 can illuminate the food items 102A-N. As depicted in FIG. 1A, the imaging device 160 and the light source 105 can be positioned over the conveyor belt 104 in a storage facility.

The imaging device 160 can be configured to continuously capture image data of the food items 102A-N as they are moved along the conveyor belt 104 to one or more storage locations or other destinations within the storage facility (block A). The images can be captured under UV light conditions provided by the light source 105.

The food items 102A-N can include, but is not limited to, fruits, citrus fruits, vegetables and meats. For example, the food items 102A-N can include fruits of plants in the genus *Citrus*, including, but not limited to, citrons (*C. medica*), mandarins (*C. reticulata*), pomelos (*C. maxima*), and hybrids thereof, such as oranges, grapefruit, lemons, limes, and tangerines. As another example, the food items 102A-N can include other types of fruits and produce, including but not limited to apples, mangos, avocados, cucumbers, etc.

Here, the food items 102A-N can be received at the storage facility from a shipping vendor and loaded onto the conveyor belt 104. The food items 102A-N can be in cases, containers, on pallets, flats, and/or placed directly on the conveyor belt 104. In some implementations, the food items 102A-N may be static or otherwise not being moved on the conveyor belt 104 in the storage facility when the images are captured by the imaging device 160. For example, some of the food items 102A-N can be sampled randomly and placed inside a photobox, as described in the MACHINE LEARNING-BASED ASSESSMENT OF FOOD ITEM QUALITY Application. Cameras positioned in the photobox can capture image data of the food items 102A-N in uniform UV lighting conditions, which can then be analyzed by the computer system 150 to obtain an estimation of quality distribution of a batch of the food items 102A-N.

The imaging device 160 can transmit the image data to the computer system 150 (block B). The computer system 150 can then apply one or more models to the image data in order to identify features of the food items 102A-N (block C). The features can indicate a quality of the food items 102A-N, such as whether the food items 102A-N are healthy or infected. The features identified using the models can include different colors or textures on a surface, skin, or peel of the food items 102A-N that are correlated with health and infected quality metrics for that particular type of food item.

The model(s) can be trained to identify and categorize fluoresced color features of the food items 102A-N in the image data with different quality features indicative of health of the food items 102A-N (e.g., browning, rotting, spoilage, desiccation, mold, bruising, latent infections, wound infections, etc.).

Therefore, in block C, the computer system 150 can apply the model(s) to the image data to identify different color features of the food items 102A-N that is indicative of health of the food items 102A-N. The model(s) can be trained using machine learning techniques to identify features of different food items. The computer system 150 can select one or more models to apply in block C based on the type of food items 102A-N identified in the image data. Moreover, as described throughout this disclosure, the computer system 150 can apply the models to each of the food items 102A-N identified in the image data in order to determine a quality metric (e.g., healthy, infected, rotting, molding, etc.) per food item. The computer system 150 can also apply the models to a batch or flat of the food items 102A-N captured in the image data to determine an overall quality metric for the batch or flat of the food items 102A-N.

The computer system 150 can determine quality metrics for the food items 102A-N based on the identified features in block D. The quality metric can be an infection presence. Thus, the computer system 150 can determine, based on output from the model(s) in block C, whether infection is present in a single food item and/or the batch of food items 102A-N in the image data. If, for example, the computer system 150 determines that the food items 102A-N are infected, the computer system 150 can also determine a percentage of a surface of each food item that is covered by the infection using the image data and/or output from the model(s) in block C. The computer system 150 can also determine a current edibility (e.g., shelf life, consumption rating, freshness, ripeness, etc.) of the food items 102A-N based on whether infection is present. Moreover, the computer system 150 can determine/predict a length of time that the food items 102A-N are likely to remain edible or otherwise good for consumption. Such a determination/prediction can be helpful to determine one or more supply chain modifications for the food items 102A-N, as described herein.

The output from the model(s) in block C can be a Boolean value indicating whether infection is present or not (e.g., Yes/No, True/False, 0/1, etc.). The output can also include a numeric value on a predetermined scale, where the numeric value indicates likelihood that infection is present in the food items 102A-N (e.g., on a scale of 0 to 100, 0 can indicate that the food items 102A-N are healthy and no infection is present and 100 can indicate that infection is present/in a high quantity of/on the food items 102A-N). In some implementations, the model(s) output can include indications of whether infection is present in each of the food items 102A-N. in block D, the computer system 150 can then aggregate the indications to determine whether infection is present for the entire batch of the food items 102A-N.

In block D, the computer system 150 can normalize the output from the model(s) to determine the quality metric for the food items 102A-N. For example, the computer system 150 can adjust the output to an infection categorization scale indicating spoilage or infection of the food items 102A-N. The scale can be a numeric scale, including but not limited to 0 to 3.5, 0 to 4, 1 to 3, 1 to 5, 1 to 4, etc. A lower number on the scale can indicate that the food items 102A-N are healthy, have little presence of infection (e.g., infection presence is below a threshold infection level, which can be specific to the type of food item or other characteristics about the food item and/or growing/origin conditions of the food item), or have no infection present. A higher number on the scale can indicate that the food items 102A-N are unhealthy/infected (e.g., higher amount of spoilage in a particular food item, the batch of food items 102A-N, etc.) and have presence of infection (e.g., infection presence is above the threshold infection level). Using the disclosed techniques, the computer system 150 can identify different types of infections, such as blue and green molds caused by *Penicillium* sp., which oftentimes can show as a clear circular signal emanating from the site of a wound in a food item. The disclosed techniques can also be used to detect latent types of infections, such as *Diplodia* sp., *Colletotrichum* sp., and *Alternaria* sp. Each of these infections can have different types of signals (e.g., a trickle emanating from a stem end or button of the food item, etc.), for which the model(s) can be trained to detect, identify, and/or quantify for determining the quality metric for the food items 102A-N. Moreover, as described herein, the model(s) can be trained to detect these various types of infections in various types of food items, including but not limited to citrus fruits, produce, vegetables such as cucumbers and peppers, avocados, apples, berries, and other types of food items that can develop such pathogens and infections.

The computer system 150 can transmit the quality metric for the food items 102A-N to the user device 170 (block E). For example, the computer system 150 can transmit each quality metric for each of the food items 102A-N in the image data. The computer system 150 can transmit only some quality metrics for some of the food items 102A-N. The computer system 150 can also transmit the overall quality metric for the batch or flat of the food items 102A-N in block E.

In some implementations, the computer system 150 can also transmit the quality metric to a database for storage. The quality metric can be stored with other historical measurements and additional metadata associated with the batch of food items 102A-N and/or individual food items in the batch. This stored information can be used in a feedback loop for continuous improvement and training of the machine learning-trained models that are used to perform the techniques described herein. For example, using previously determined quality metrics, one or more higher level models can be improved and/or trained to identify quality metrics that depend on seasonality, variety, size, country of origin, and other factors.

The user device 170 can output the quality metrics in block F. The user device 170 can be a mobile device, smartphone, tablet, laptop, or other computer that can be used by a relevant stakeholder in the supply chain. In some implementations, the stakeholder can be a supply chain actor. The stakeholder can view the quality metric for each of the food items 102A-N (and/or the batch) in order to understand or analyze a return on investment (ROI) for the food items 102A-N. The outputted metrics can also be used by the stakeholder to monitor quality of the food items 102A-N over time and optionally make one or more supply chain modifications based on the current and/or projected quality (e.g., edibility, consumption rating, ripeness, firmness, infection, etc.) of the food items 102A-N.

Optionally, the user device 170 can determine one or more supply chain modifications based on the output quality metrics for the food items 102A-N (block G). The user device 170 can automatically determine or otherwise recommend supply chain modifications for one or more of the food items 102A-N based on their corresponding quality scores. In some implementations, the computer system 150 can determine or otherwise recommend supply chain modifications and transmit those recommendations to the user device 170. The stakeholder at the user device 170 can optionally perform, modify, or reject any of the recommended supply chain modifications. In some implementations, the stakeholder can review the output quality metrics and determine supply chain modifications to be implemented.

Although blocks A-G are described in FIG. 1A in reference to determine a quality metric of infection presence in the food items, the blocks A-G can also be performed to determine one or more other quality metrics of other types of food items. The one or more other quality metrics can include but are not limited to quality of a peel of the food items and/or whether the peel is intact (which can be a sign of resilience to infection and/or mold). Determinations about the peel can further be used to determine whether the food items have been damaged and/or whether or not a wound has been infected. The disclosed technology can also be used to determine whether the food items have been infected by a latent infection pathogen. Moreover, although the blocks A-G are described in reference to determining infection presence in a batch of food items, the blocks A-G can also be performed to determine infection presence in individual food items.

FIG. 1B is a conceptual diagram of a process 195 for generating a model to determine quality of a food item. As described throughout this disclosure, models can be generated for different food items, different types of food items, and different features associated with particular food items.

The computer system 150 can receive food item image data 190 in block A. The image data 190 can include digital RGB images, hyperspectral images, and/or multispectral images depicting a particular food item, food item type, different food item, different food item types, a single food item, and/or a batch of food items. The food item image data 190 can include images of the food items captured in UV light conditions, as described throughout this disclosure.

The image data 190 can also include images, tables, and/or other data of a particular food item having some particular feature to be modeled, such as rot and desiccation, and images of the same type of food item that does not have the particular feature to be modeled. For example, the food item image data 190 can include tables that are stored in a data store containing features (e.g., rot, desiccation, probability to determine shelf life, etc.) that have been extracted, labeled, and/or annotated (e.g., automatically by a computer system, such as the computer system 150 and/or manually by a relevant stakeholder or other user) from images of the food items. In some implementations, the food item image data 190 can include images of an exterior of the food items and/or an interior of the food items. In some implementations, the food item image data 190 can include images of a particular food item at different stages of ripeness and between stages of ripeness. The image data 190 can also include images of a particular food item at different stages of infection development (e.g., browning, rotting, molding, desiccating, bruising, etc.) over some predetermined period of time.

The food item image data 190 can be a robust collection of training data indicating a plurality of different features that may exist and/or develop for the particular food item throughout the food item's lifecycle. The image data 190 can also be a collection of images of the same food item from different angles, such that the entire food item can be analyzed fully using the techniques described herein. Moreover, in some implementations, the image data 190 can include labels for features, conditions, and/or qualities of the food item. In yet some implementations, such features, conditions, and/or qualities of the food item can be learned using image data 190 that does not include labels.

As mentioned above, the computer system 150 receives the image data 190 (block A). The image data 190 can be received from one or more imaging devices, such as the imaging device 160 described herein. The image data 190 can also be retrieved from a data store.

The computer system 150 can identify and cluster features of the food items from the image data in block B. In some implementations, the computer system 150 can perform object detection techniques to identify each food item in the image data 190. The computer system 150 can then randomly select one of the identified food items for purposes of training. Thus, the computer system 150 can generate and train the model(s) described herein using one of the food items in the image data 190. In some implementations, the computer system 150 can generate and train the model(s) described herein using more than one of the food items in the image data 190.

In block B, the computer system 150 can identify features indicative of a quality of the food item. For example, the computer system 150 can identify color of the food item that is correlated to/corresponds to rot, mold, different types of texture, bruising, or other types of infection from RGB image data. As described further throughout this disclosure, the identified features can be labeled. Object detection techniques can be performed on the image data in order to detect the food items, identify the food items and then perform additional extraction steps to pick out one or more particular features of the food items.

The computer system 150 can also cluster the food item features based on their color data in block B. The computer system 150 can use k-means clustering techniques to cluster features based on their color. The computer system 150 can also use other types of clustering techniques. The computer system 150 can generate three clusters. One cluster can represent a background in the image data 190 (e.g., a flat, pallet, container, conveyor belt, or other surface on which the food items rest). Another cluster can represent healthy features of a surface on the food items in the image data 190 (e.g., skin or peel of the food items that does not include colors indicative of infection, rot, mold, desiccation, browning, bruise, etc.). Another cluster can represent unhealthy or infected features on the surface of the food items in the image data 190 (e.g., skin or peel of the food items that does include colors indicative of infection, rot, mold desiccation, browning, bruise, etc.). In some implementations, the computer system 150 can generate fewer or more clusters. For example, the computer system 150 can generate one or more additional clusters to represent one or more other features of the food items for which to determine food item quality.

In block C, the computer system 150 can map the clusters of food item features in multi-color space. The multi-color space can be RGB space. One or more other color spaces can be used for mapping purposes. In block C, the computer system 150 can map a cluster of infected features, a cluster of healthy features, and a cluster of background features to different colors in the multi-color space.

The computer system 150 can then generate the machine learning model(s) using the mapped clusters (block D). In some implementations, the model can be generated and/or trained by one or more other computing systems, computers, networks of devices, and/or cloud-based services. The model can, for example, be trained by a remote computer system, stored in a data store, and accessible and executed by the computer system 150. The model can be generated using machine learning techniques, including but not limited to k-means clustering or other clustering techniques. Convolution neural networks (CNNs) and other machine learning techniques may also be used for training purposes. The computer system 150 can generate a model for each of the identified and labeled features. Each model can also be trained to score a quality of the food items based on the identified feature. As an example, the model can be trained to determine infection presence in oranges and score an amount of infection presence in the oranges.

For example, the computer system 150 can retrieve image data of a flat of oranges. The computer system 150 can process the image data in RGB space. Using object detection techniques, the computer system 150 can identify each orange in the image data and generate a bounding box around each. The computer system 150 can select (e.g., randomly) one of the bounding boxes to analyze the orange therein in RGB space. The computer system 150 can train a model using k-means clustering techniques to identify and cluster color features indicative of a background, healthy part of the orange, and unhealthy or infected part of the orange. The clusters can be visualized in RGB space to accurately identify a center of an infection, a spread of the infection over the surface of the orange, a healthy portion (uninfected portion) of the surface of the orange, and a background surrounding the orange. The model can also be trained to output an indication of whether infection is present in the orange. The indication can be a Boolean value (e.g., True/False, Yes/No, Unhealthy/Healthy, Infection/No Infection, etc.), a string value (e.g., "infected food item"), and/or a numeric value (e.g., on a scale of 0 to 5, where 0 indicates healthy/no infection and 5 indicates most unhealthy/most infection).

The generated model can then be outputted by the computer system 150 (block E). During runtime, the generated model can be applied to image data to identify features indicative of quality in the imaged food items. Outputting the generated model can include presenting the model to a user at a user device. The user can then select the model to be applied during runtime. Outputting the generated model can also include storing the model in a data store or other database. The model can then be retrieved by the computer system 150 and/or the user device during runtime.

As an illustrative example, the computer system 150 can receive image data of oranges in UV lighting. Using segmentation and analysis techniques, infection can be a feature identified by the computer system 150. Food items in the image data can be labeled as infected while image data of oranges that do not show signs of infection can be labeled as good or healthy oranges. Using a CNN, k-means clustering, or other machine learning techniques, an orange infection model can be trained to differentiate image data showing infection from image data that does not show infection. For example, the model can be trained to analyze each patch and/or pixel in image data to see whether an orange is present, and if the orange is present, whether the orange appears to show signs of infection or not, based on the labeled image data. If the orange appears to show signs of infection, the model can be trained to tag or otherwise classify/label the orange in the image data as infected. The model can also be trained to tag the orange with other descriptors for infection, including but not limited to numeric values, Boolean values, and/or string values indicating infection presence in the orange.

Although training in the process 195 is described from the perspective of generating one model, the process 195 can also be used to generate more than one model. Each model can be generated and trained to determine various other quality features in various other types of food items, as described herein. Moreover, although the process 195 is described as being performed by the computer system 150, the process 195 can also be performed by one or more other computing systems, devices, network of devices, and/or cloud-based systems.

FIG. 1C is a diagram of an example system 100 for assessing quality of one or more food items 102A-N based on image data. The system 100 can include an image sensor 106, an extraction engine 110, a food item detection engine 120, a quality assessment engine 130, and a quality evaluation engine 140. For purposes of the present disclosure, an "engine" can include one or more software modules, one or more hardware modules, or any combination thereof.

The image sensor 106 can be used to generate image data 108 that represents attributes of the food items 102A-N, where N is any positive integer number greater than 0 and represents a number of food items 102A-N on conveyor belt 104. The image sensor 106 can be part of an imaging device, such as the imaging device 160 described in reference to FIG. 1A. In the example of FIG. 1C, the image sensor 106 can be arranged in a manner that enables the image sensor 106 to capture image data 108 that represents one or more images of the food items 102A-N as the food items 102A-N are advanced along the conveyor belt 104, as described in reference to FIG. 1A. In some implementations, the image sensor 106 can include one or more hyperspectral sensors configured to capture hyperspectral data that represents features of the food items 102A-N. In such implementations, each pixel of the hyperspectral image can correspond to a spectrum of infrared or ultraviolet light associated with a corresponding food item imaged by a camera equipped with one or more sensors operating in a corresponding spectral range. The spectrum of visible light can also be used to reconstruct RGB images of the food items 102A-N described throughout this disclosure. In some implementations, the sensor 106 can be a low-resolution digital camera (e.g., 5M or less), a high-resolution digital camera (e.g., 5 MP or more), or any other type of sensor that can capture the image data 108. The sensor 106 can cover a range of 300 nm-1700 nm of the spectrum. One or more other sensors, such as sensors in a hyperspectral camera, can cover wavelengths in a range of 300 nm-2500 nm. One or more other cameras can be used, including but not limited to ultraviolet capturing cameras described herein.

In some implementations, the sensor 106 can include multiple sensors positioned at multiple angles relative to the food items 102A-N. For example, the sensor 106 can include a first camera and at least one additional second camera that each capture image data 108 of the food items 102A-N from different perspective angles. In such configurations, the one or more additional cameras can be used to generate image data 108 based on different or additional wavelengths of light than the wavelengths of light captured by the first camera. In general, any set of wavelengths of light can be obtained by the sensor 106.

Each particular camera of the one or more cameras can be configured to detect the different or additional wavelengths of light in a number of different ways. For example, in some implementations, different sensors can be used in different cameras in order to detect different or additional wavelengths of light. Alternatively, or in addition, each of the one or more cameras can be positioned at a different heights, at different angles, or the like relative to each other in an effort to capture different wavelengths of light. In some implementations, one or more cameras can be positioned, at least in part, to capture portions of the food items 102A-N that may be obscured from a view of the first camera.

In some implementations, one or more light sources 105 can be used to illuminate the food items 102A-N so that image sensor 106 can capture clearly image data 108 of the food items 102A-N, as described in reference to FIG. 1A. The light source 105 can include one or more light sources that each produce a same or different electromagnetic radiation. In this example, the light source 105 is depicted as being affixed to the image sensor 106. In some implementations, the light source 105 can be positioned in one or more locations in a vicinity of the image sensor 106 in order to illuminate the food items 102A-N before and/or during capture of the image data 108. In some implementations, the light source 105 can be selected based on a frequency of the electromagnetic radiation output. For example, in some implementations, the light source 105 can be a halogen light source. Alternatively, or in addition, the one or more light sources 105 can be a diode or series of diodes of broadband light-emitting diodes (LEDs) that can be used to provide light across the visible wavelength spectrum, near infrared wavelength spectrum, electromagnetic spectrum, or any other spectrum of light.

The light source 105, or a control unit of the light source 105, can be communicably connected to the image sensor 106, or a control unit of the image sensor 106. For example, the image sensor 106, or the control unit of the image sensor 106, can send a signal to the light source 105, or the control unit of the light source 105, that cause the light source 105 to illuminate the food items 102A-N with one or more specific wavelengths of light at a specific power and/or at a specific moment in time. In some implementations, the specific moment in time can be a predetermined amount of time before, or during, capturing of the image data 108.

The image data 108 generated by the image sensor 106 can be provided as an input to the extraction engine 110. The image data 108 can include one or more images of the food items 102A-N. Such images can also include one or more HSIs. In some implementations, the image sensor 106 can directly provide the image data 108 to the extraction engine 110. The extraction engine 110 can then process the image data 108. In some implementations, the image sensor 106 can store the image data 108 in a data store and/or memory device. Then the extraction engine 110 can access the data store and/or memory device to obtain and process the image data 108.

The extraction engine 110 can obtain/receive the image data 108. As shown in FIG. 1C, the image data 108 can be one image of a plurality of the food items 102A-N. Thus, the image data 108 can be made up of a plurality of images 108A-N, where each of the images 108A-N corresponds to a food item 102A-N. The image data 108A-N can include a depiction of n food items 102A-N. The image data 108A-N can also include a portion of an environment surrounding the food items 102A-N, such as the conveyor belt 104 or a portion of a food processing facility (e.g., a pallet, flat, container, box, or other mechanism for holding the food items 102A-N). The extraction engine 110 can process the obtained image data 108 and extract a portion 112 of the image data 108, as described herein. As shown, the extracted portion 112 can include the food items 102A-N without the surrounding environment. In some implementations, the extracted portion 112 may only include one of the food items 102A-N.

The extracted image portion 112 (referred to herein as the extracted image 112) of the image data 108 can be provided as an input to a food item identification engine 120. In some implementations, the extraction engine 110 may directly provide the extracted image 112 to the food item identification engine 120. In some implementations, the extraction engine 110 may store the extracted image 112 in a memory device and then the food item identification engine 120 can access the memory device.

The food item identification engine 120 can use one or more object recognition algorithms/techniques to recognize portions of the extracted image 112 that correspond to the food items 102A-N. As an illustrative example, the food items 102A-N can be avocados. The food item identification engine 120 can be trained on a plurality of images of avocados to determine, from the extracted image 112, whether or not one or more avocados are depicted and what regions of the extracted image 112 include the avocados. Thus, the food item identification engine 120 can be trained to determine bounding boxes around each of the food items 102A-N in the extracted image 112. The engine 120 can also be trained to produce output data in the form of an annotated image 122 of the food items 102A-N. In producing the annotated image 122, the engine 120 can annotate or otherwise index each of the bounding boxes 122A-N representing each of the food items 102A-N. As described throughout this disclosure, machine learning trained models can then be applied to each of the bounding box regions 122A-N to determine quality metrics for each of the food items 102A-N.

In some implementations, the annotated image 122 can include a coordinate system to annotate or index locations of each of the food items 102A-N. Numerical values, such as x and y values in an x and y coordinate system, can be used to represent locations of the food items 102A-N in the annotated image 122. Subsequent processing steps can use the numerical values that represent the locations of the food items 102A-N to determine outer boundaries of each of the food items 108A-N.

The annotated image 122 generated by the food item identification engine 120 can be provided as an input to a quality assessment system 130. In some implementations, the food item identification engine 120 may directly provide the annotated image 122 to the quality assessment system 130. In other implementations, the food item identification engine 120 may store the annotated image in a memory device and then the quality assessment engine 130 can access the memory device to obtain and process the annotated image 122.

The quality assessment engine 130 can be configured to determine quality metrics for each of the food items 108A-N depicted in the annotated image 122. As described throughout this disclosure, the engine 130 can use one or more machine learning trained models to determine the quality metrics. Each of the models can be trained to identify different features indicative of different quality metrics for the food items 108A-N. For example, each model can be executed by different quality assessment engines 132A-N. Each quality assessment engine 132A-N can be configured to perform a particular quality assessment operation on the annotated image 122A-N for each of the food items 108A-N. For example, one of the quality assessment engines 132A-N can be configured to detect presence of infection in the annotated images 122A-N of the food items 108A-N. Another of the quality assessment engines 132A-N can be configured to detect particular types of infection, such as latent infection or wound infection. Another of the quality assessment engines 132A-N can be configured to detect firmness of the food items 108A-N in the annotated images 122A-N. Yet another of the quality assessment engines 132A-N can be configured to detect ripeness of the food items 108A-N in the annotated images 122A-N. In some implementations, one or more of the engines 132A-N can be executed in series. Sometimes, one or more of the engines 132A-N can be executed in parallel. Executing in parallel can be advantageous to reduce an amount of time needed to process the annotated image 122 and perform multiple quality assessments of the food item depicted therein. In some implementations, only some of the engines 132A-N can be selected for execution, either in series or in parallel.

In some implementations, the set of quality assessment engines 132A-N can be configured based on a type of the food items 108A-N being analyzed. The quality assessment engines 132A-N can also be configured based on business practices of a business entity implementing the system 100 or relevant stakeholders throughout the supply chain of the food items 108A-N.

Still referring to FIG. 1C, the quality evaluation engine 140 can be configured to evaluate overall quality of the food items 108A-N based on the quality metrics determined by the engines 132A-N. For example, the engine 140 can determine an aggregate quality of a batch of the food items 108A-N. The engine 140 can also determine, for each of the food items 108A-N, a percentage of surface area of the food item that is covered by a detected infection. In some implementations, the engine 140 can also determine a current edibility (e.g., consumption rating) of the food items 108A-N and/or a length of time of edibility of the food items 108A-N (e.g., based on how much infection is detected in a particular food item or a batch of the food items and/or based on an infection percent of coverage on the particular food item or the batch of food items).

As described herein, the engine 140 can also determine one or more supply chain modifications based on the quality metric of the food items 108A-N. For example, if the engine 132A determines that the food items 108A-N are infected and the engine 140 determines that approximately 80-90% of the surface area of each of the food items 108A-N (or a majority of the food items 108A-N) in the batch are covered by infection, the engine 140 may further trigger an update to a distribution plan for the food items 108A-N such that the food items 108A-N are routed to a food processing plant so that they are not wasted. If the engine 140 determines that these food items 108A-N still have some shelf life remaining and thus are consumable for some period of time, the engine 140 can generate instructions to route the food items 108A-N to nearby retail environments so that they can be purchased and consumed by end users before their shelf life/edibility expires. Numerous other example operations can be determined and performed based on quality metrics that are determined by the engines 132A-N (e.g., an engine can provide quantitative means for differentiating different batches of food items based on aggregate quality scores).

As described throughout this disclosure, the quality metrics generated by the engines 132A-N can be numeric, binary, and/or Boolean values. The quality metrics can be numeric values on predefined scales. The quality metrics can also be values such as "good," "bad," "poor," "ok," "excellent," "moderate," "sufficient," etc. As another example, output data can be a vector of one of two different values for each depicted food item 108A-N that provides an indication of a quality pass or a quality fail for each food item 108A-N (e.g., healthy or unhealthy/infected). An overall quality metric can also be determined for each depicted food item 108A-N based on the vector of quality metrics that are outputted by the engines 132A-N. One or more different values can be defined based on the supply chain and/or practices of relevant stakeholders in the supply chain.

In some implementations, overall quality scores 134A-N can be generated for each of the food items 108A-N in an output image 134. The overall quality scores 134A-N can be a numeric indication of how much infection is present in the particular food item 108A-N and/or how likely the particular food item 108A-N is infected. The higher the score on a numeric scale, the more likely infection is present and/or the more infection is present in the particular food item. The lower the score on the numeric scale, the less likely infection is present and/or the less infection is present in the particular food item. The numeric scale shown in FIG. 1C can be on a scale of 0 to 1. One or more other numeric scales can be used, including but not limited to 0 to 5, 0 to 3, 1 to 5, 1 to 3, 1 to 4, 0 to 100, etc.

The overall quality scores 134A-N can be viewed by a relevant stakeholder in the supply chain. The stakeholder can view the scores 134A-N and determine one or more modifications to the supply chain. The quality metrics generated by the engines 132A-N can also be outputted in one or more other forms for review by the relevant stakeholders.

Figure 2A:
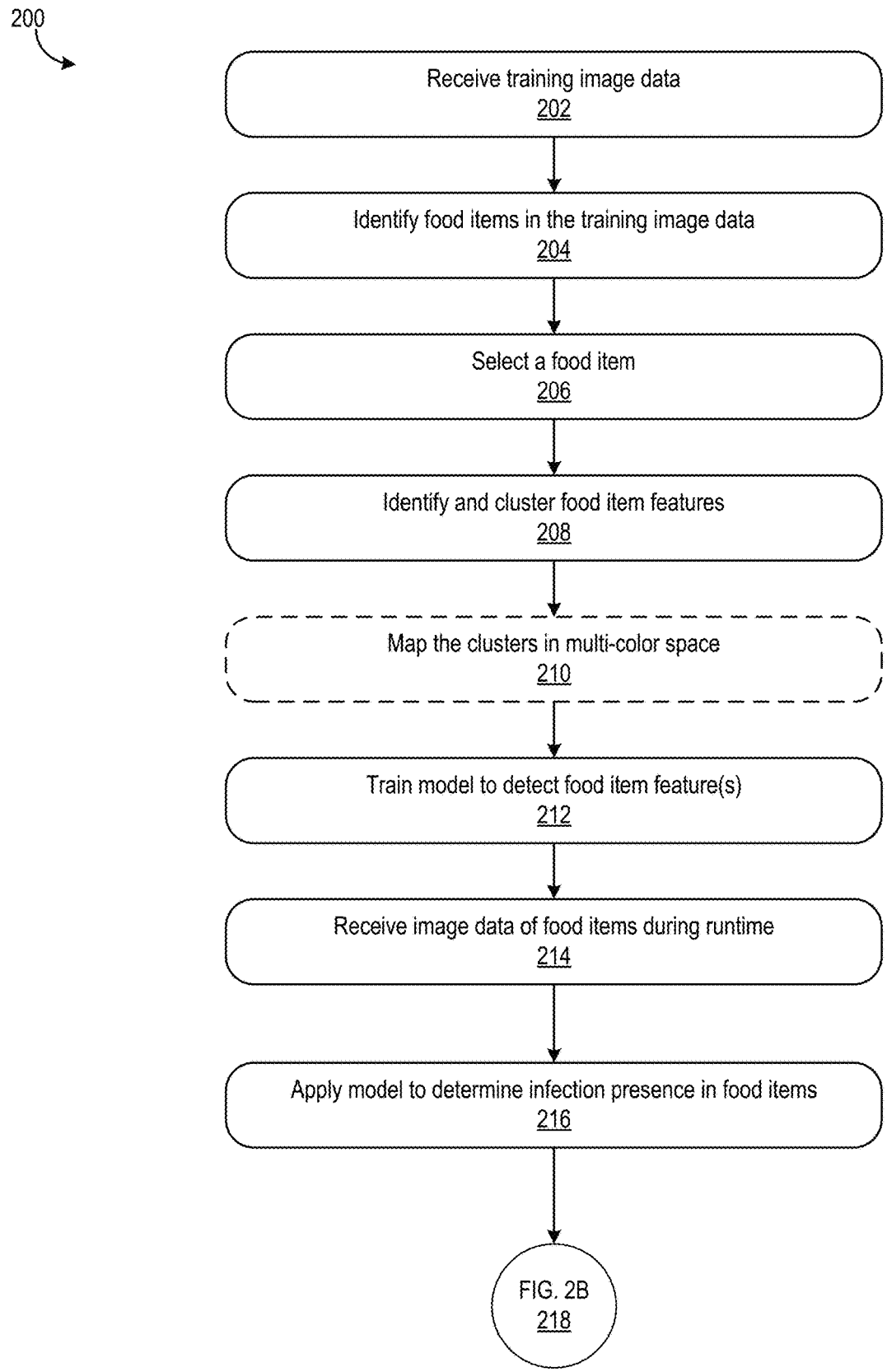
FIGS. 2A-B is a flowchart of a process for determining food item quality based on image data.
Figure 2B:
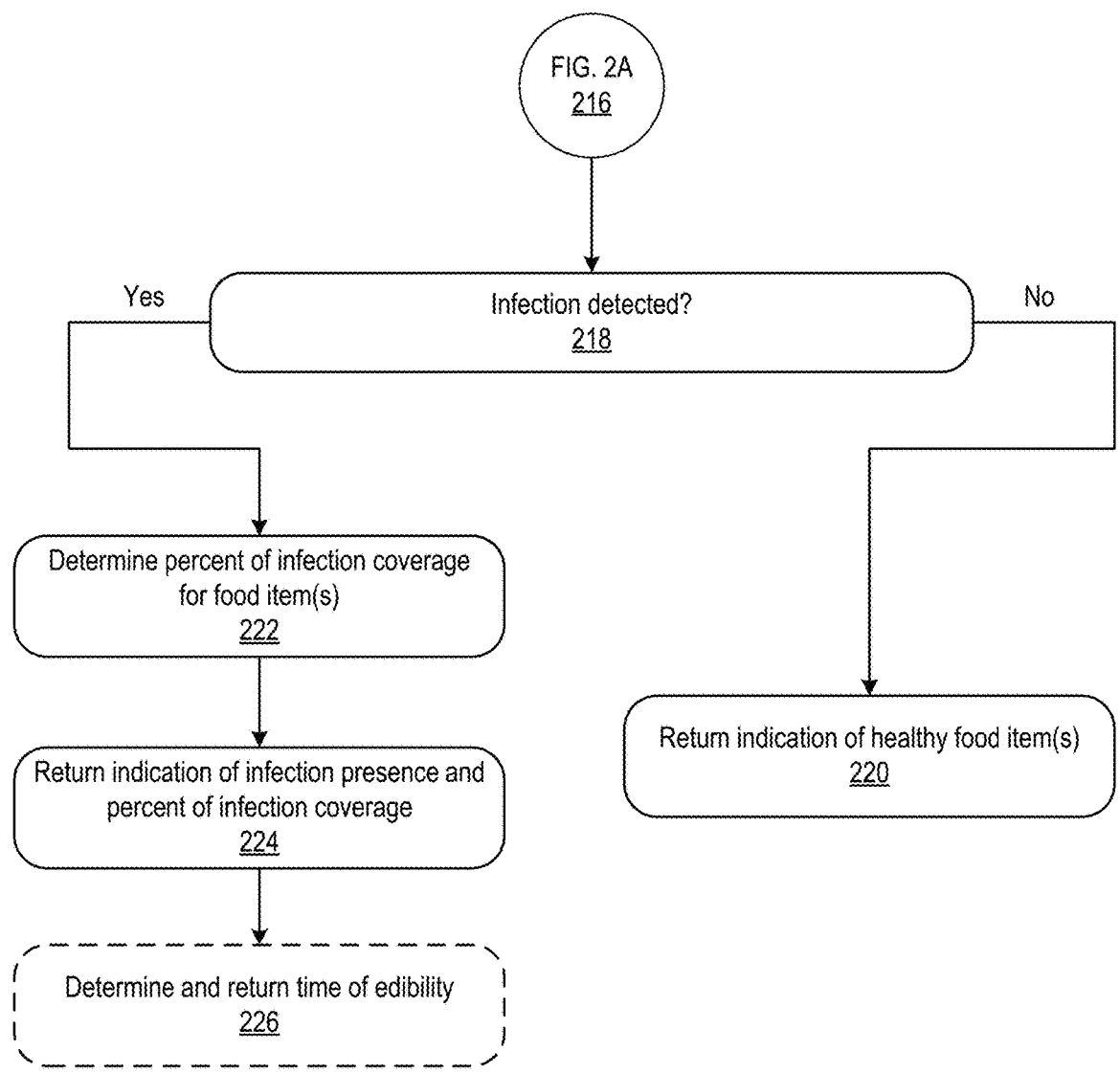

FIGS. 2A-B is a flowchart of a process 200 for determining food item quality based on image data. The process 200 can be performed by the computer system 150. The process 200 can also be performed by one or more other computing systems, devices, computers, networks, cloud-based systems, and/or cloud-based services. For illustrative purposes, the process 200 is described from the perspective of a computer system.

Referring to the process 200 in both FIGS. 2A-B, the computer system can receive training image data in block 202. As described throughout, the image data can be captured in UV lighting conditions. Some of the image training data can be captured in other lighting conditions, such as in the visible light spectrum and/or shortwave visible light. Capturing the image training data in the other lighting conditions may require use of at least one narrow bandpass filter between the food items being imaged and an imaging device so that a fluorescent signal from the food items is not washed out by visible light from a light source. The training image data can be received from an imaging device, as described in FIG. 1A. The training image data can also be retrieved from a database, data store, or other repository storing image data of a particular food item. The image data can include images of the particular food item whose quality is supposed to be determined based on different features visible or non-visible from the image data. The training image data can be captured of the food item at one or more different times throughout the supply chain of the food item. For example, the training image data can be captured of the food item before it is transported from farm to storage facility, upon arrival at the storage facility, during transport in the storage facility to a storage location upon transport from the storage facility to an end-consumer retail environment, upon arrival at the end-consumer retail environment, etc.

In block 204, the computer system can identify food items in the training image data. The computer system can use object detection techniques to generate a bounding box around each food item in the training image data. As described herein, a model can be trained with high accuracy using one food item in the training image data. The model can also be trained, validated, and/or tested using multiple food items in the training image data. The computer system can also generate a numeric grid index for the bounding boxes such that each grid index represents a different food item in the training image data. The grid indexes can be used to identify the food items in data stores or other storage techniques.

Optionally, as part of identifying the features, the computer system can apply ground truth labels to the image data. Features such as rot, mold, ripeness, desiccation, bruises, etc. can be identified from the training image data and labeled/annotated accordingly for each of the food items in the image data. In some implementations, one or more features, such as firmness and dry matter, may not be visible from the training image data and therefore can be labeled using other techniques, such as destructive techniques involving durometers and/or penetrometers that puncture or penetrate the skin, surface, peel, or flesh of the food items in the training image data.

The computer system can also select a food item in block 206. The computer system can use a random number generator to randomly select a bounding box from the training image data. The food item in the selected box can then be used for training purposes. In some implementations, the computer system can select the bounding box that includes a food item with a threshold quantity of feature labels. The computer system can also select the bounding box having a food item that satisfies other threshold feature criteria. The threshold feature criteria can correspond to features indicative of infection in the particular type of food item. For example, the computer system can select the bounding box containing a food item with features to be modeled, the features including bruises, rot, mold, desiccation, browning, other discoloration of the food item's skin/surface/peel, etc.

The computer system can identify and cluster food item features for the selected food item in block 208. As described herein, the computer system can analyze pixel data in the bounding box of the selected food item to differentiate the pixels and categorize them into clusters. A first cluster can correspond to pixels representing a background in the bounding box. A second cluster can correspond to pixels representing healthy portions of the food item (e.g., a part of the surface/skin/peel of the food item that does not include features that have been labeled as indicative of infection). A third cluster can correspond to pixels representing unhealthy portions of the food item (e.g., a part of the surface/skin/peel of the food item that includes features such as bruise, mold, rot, desiccation, discoloration, etc. indicative of infection). Additional or fewer clusters may also be generated in block 208. For example, the third cluster can further be broken up into additional sub-clusters to provide more granular analysis of the quality of the food item. A sub-cluster, as an illustrative example, can correspond to pixels representing a center/origin of mold on the food item. Another sub-cluster can correspond to pixels representing a spread of the mold emanating from the center/origin across the surface of the food item. As another example, sub-clusters can correspond to different degrees of mold. One illustrative sub-cluster can be a manifested white mold, another sub-cluster can correspond to blue mold, another sub-cluster can correspond to latent infection not visible under visible light conditions but only present in UV light conditions, etc.

Optionally, in block 210, the computer system can map the clusters in multi-color space. The multi-color space can be RGB space. Mapping the clusters into multi-color space can provide a clearer visualization of the different features represented in the training image data. Mapping the clusters into multi-color space can also provide for clearer visualization of infection or other unhealthy features in the food item that cause the food item to have lower quality at a current time and/or over some period of time. Such features may otherwise not be readily visible to the human eye or in the visible light spectrum.

The computer system can train a model to detect food item features in block 212. The computer system can train the model using the optionally mapped clusters from block 210. Model training can be performed using k-means clustering techniques. One or more other clustering techniques can also be used for model training. For example, Gaussian Mixture Model (GMM), K-nearest neighbors (KNN), K-medians, Hierarchical clustering, and/or Density-Based Spatial Clustering of Applications with Noise (DBSCAN) techniques can be used for model training. In some other implementations, where pixels are not easily clustered into healthy/infected clusters, a supervised instance segmentation model (e.g., CNN-based) can be trained. In this example, a training dataset with labels can be generated and different sections of food items can be annotated manually. Then, the model can be applied to each bounding box in image data of the food items and a segmentation map (e.g., segmented image) can be predicted. The segmentation map can then be used instead of (or in addition to) a cluster map. The segmentation map can be used in the same way as clusters may be used in the disclosed techniques of the process 200.

The computer system can also train more than one model in block 212. The computer system can train a model per food item type. The computer system can also train a model per quality feature of the food item (e.g., ripeness, firmness, infection, latent infection, wound infection, bruise, rot, mold, desiccation, tartness, taste, etc.). The trained model can be stored in a data store for retrieval during runtime use. The model can also be stored in local memory at the computer system for runtime use. Refer to FIG. 1B for additional discussion about training the model.

The model that is generated in block 212 can be trained to receive image data of a food item (or batch of food items) as input. Using the model, the computer system can identify features indicative of infection in the food item. The model can then return, as output, an indication of infection presence in the food item. The model output can be a numeric, Boolean, and/or string value.

A numeric value, for example, can be a value on a predetermined scale. The predetermined scale can be 0 to 3.5, for example. On this scale, a value closer to 0 can indicate no or little presence of infection in the food item. A value closer to 3.5 can indicate some quantity of infection being present in the food item. As another example, a value closer to 0 can indicate little or no likelihood of infection presence whereas a value closer to 3.5 can indicate higher likelihood of infection presence in the food item.

A Boolean value can be binary, such as True/False, Yes/No, 0/1, Infection/No Infection, etc. The Boolean value can indicate whether infection is present in the food item. A string value can indicate whether infection is present and/or a likelihood of the infection presence. For example, a string value outputted by the model can indicate "Infection is present in the food item," "Infection is not present in the food item," "Infection is likely present," and/or a degree of infection presence in the food item. One or more other outputs can be generated by the model.

During runtime, the computer system can receive image data of food items (block 214). As described in reference to FIGS. 1A and 1C, the image data can be captured in UV light conditions and received from imaging devices, such as the imaging device 160 and/or the image sensor 106. The food items in the image data can be of the same type as the food items in the training image data. In some implementations, the image data received in block 214 can be of just one food item. The image data can also include a batch, flat, pallet, bunch, or group of food items of the same food type.

The computer system can apply the model to the image data to determine infection presence in the food items in block 216. The computer system can determine infection presence in each food item in the image data. For example, the computer system can perform object detection techniques to identify bounding boxes around each food item in the image data. The model can then receive each bounding box as input to determine the infection presence of the particular food item in the bounding box. The computer system can also determine an overall infection presence for the food items in the image data. For example, the model can receive the image data as input and determine an average infection presence for the food items. The model can also determine infection presence for each food item in the image data. Then, the computer system can average, sum, or otherwise aggregate the infection presences for each of the food items to determine an overall infection presence for the batch of food items represented in the image data.

As described herein, the model can be used to analyze color features in the image data. The colors in the image data can be clustered and mapped into a color space (e.g., RGB-space, CIELAB space, or other three-dimensional color space(s)). The model can then analyze each of the clusters in the color space to determine whether infection is present. For example, the computer system can determine that infection is present if a cluster associated with infection has a pixel size and/or color value that exceeds some threshold infection criteria. The computer system can also determine that infection is present if the cluster associated with infection is located in a region of the image data other than boundaries or a border of the image data (which can indicate a background of the image data). The threshold infection criteria can be based on historical data, such as customer preferences, a quality and/or level of infection presence of the food item that a customer would still purchase and/or consume, and/or other factors. This process can be effective in accurately assessing and scoring infection features of food items, even if they are not readily apparent in the visible light spectrum. This process can also be computationally easy and fast, thereby utilizing less time and compute resources to determine quality of the food item based on image data captured in UV light conditions.

In some implementations, the computer system can select which model or models to apply to the image data based on a type of food item that is imaged. For example, the computer system can identify a type of the food items in the image data using object recognition techniques. The computer system can also identify the food item type by applying an identification model to the image data. The model can be trained using machine learning techniques, such as deep neural networks, CNNs, etc., to detect food items in the image data and then identify a type of the food items. The computer system can then retrieve one or more models associated with the identified type of food items from a data store or other database that stores the generated models. In some implementations, the computer system can use metadata that is part of the image data to determine which model(s) to retrieve. The metadata can indicate, for example, a country of origin, geographic location of origin, food item type, growing conditions, known/historic ripening conditions for the food items, etc.

In block 218, the computer system can determine, based on the model output, whether infection is detected in the food items. As mentioned above, the model can be trained to generate output indicating presence of infection in the food items. The computer system can return the output in block 218. The computer system can also normalize, process, or otherwise convert the model output to an indication of infection presence for a particular food item and/or the batch of food items in the image data.

If infection is not detected, the computer system can return an indication of healthy food item(s) (block 220). For example, the computer system can determine that infection is not present in a food item if the model output indicates infection presence that is below a predetermined threshold infection level. The computer system can also determine that infection is not present in the food item if the model output indicates no presence of infection in the food item. In some implementations, if any quantity of infection is detected in the food item, then the computer system can determine that infection is present.

Figure 3A:
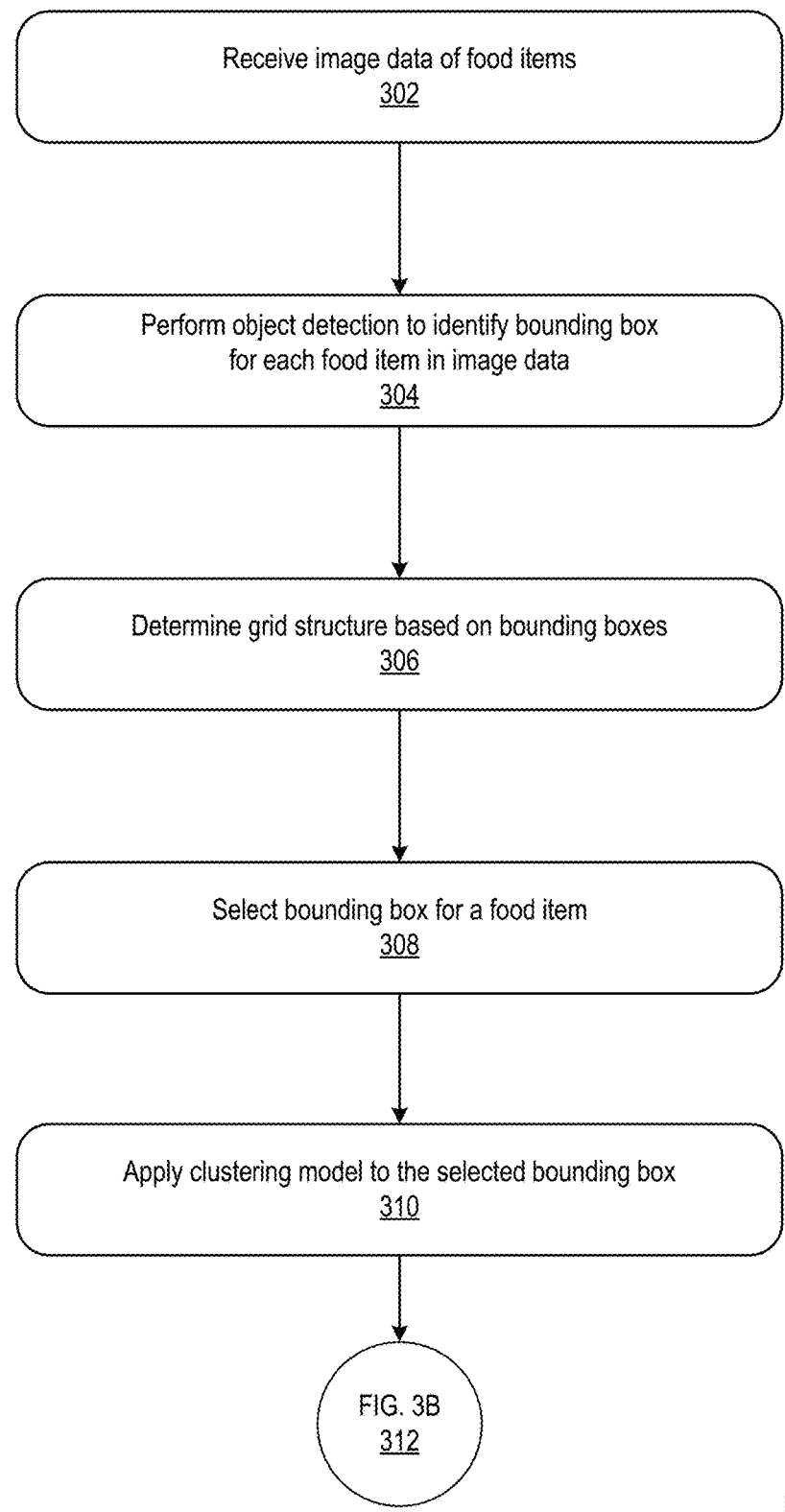

Returning the indication of healthy food item(s) can include storing the indication in a data store for later retrieval, use, and/or output. Returning the indication can also include transmitting the indication to a user device of a relevant stakeholder in the supply chain of the food items. The indication can then be used by the computer system and/or the relevant stakeholder to determine, generate, and/or implement one or more supply chain modifications. Refer to FIGS. 3A-B for additional discussion about the supply chain modifications.

If infection is detected, the computer system can determine a percent of infection coverage for the food item(s) in block 222. The computer system can make this determination for each of the food items that have been identified as having infection present. To determine the percent of coverage, the computer system can sum a quantity of pixels indicative of infected portions of the food item and divide this sum by all pixels indicative of infected portions and healthy portions of the food item. The computer system can then multiply the result of this division by 100 to get a percentage value indicative of how much of a total surface of the food item is infected.

In some implementations, the model can be trained in block 212 to determine the percent of infection coverage in food items that are determined to have infection present. Moreover, in some implementations, blocks 208 and 210 may not be performed since the model can be trained to predict the percent of infection coverage directly from the image data. Sometimes, the model can predict different segments in the image data directly, such as healthy, infected, and background segments, then use those segments to compute the percent of infection coverage. In some implementations, the computer system can apply a model in block 222 that has been generated and trained to determine the percent of infection coverage of infected food items.

The computer system can return an indication of the infection presence and the percent of infection coverage in block 224. The computer system can return indications for each of the food items in the image data. The computer system can also return an aggregated value for the batch of food items (e.g., by summing, averaging, and/or aggregating the indications for the infected food items against a total quantity of food items in the image data, etc.). The indication of the infection presence and the percent of infection coverage can be represented with the image data. For example, a bounding box of an infected food item can be returned in which the food item is shown in multi-color space (e.g., RGB space). In multi-color space, an infected portion of the food item can be more clearly visualized from a healthy portion of the food item as well as a background in the bounding box. The bounding box can also include an indication of the percent of infection coverage for the particular food item.

As mentioned above with regards to block 220, returning the indication in block 224 can include storing the indication in the data store. Returning the indication in block 224 can also include transmitting the indication to the user device of a relevant stakeholder for output in a graphical user interface (GUI) display. The indication can then be used by the computer system and/or the relevant stakeholder to determine one or more supply chain modifications for the particular food item and/or the batch of food items. Refer to FIGS. 3A-B for additional discussion about the supply chain modifications.

Optionally, the computer system can determine and return a length of time of edibility for the food items in block 226. Given a sufficient amount of time series data (e.g., 4 weeks) of infection evolution on food items over time combined with metadata such as country of origin, harvest date, storage temperature, etc., a model can be built to predict infection growth on the food items over time and therefore estimate when the infection is going to reach an edibility threshold. As an illustrative example, food items can be assessed for fluorescence at time=0. The fluorescence can be categorized based on fluorescence signal (e.g., non, low, medium, high). The food items can be incubated at relevant conditions and tracked for spoilage over a predetermined amount of time, such as a next 4 weeks. The amount of spoilage per image over the predetermined amount of time can then be calculated. When new food items are analyzed, the amount of fluorescence detected for these new food items can be correlated/related back to a model build from the original data captured over the 4 weeks mentioned above. As a result, the computer system can estimate risk of spoilage in the new food items relative to a future point in time.

Figure 4:
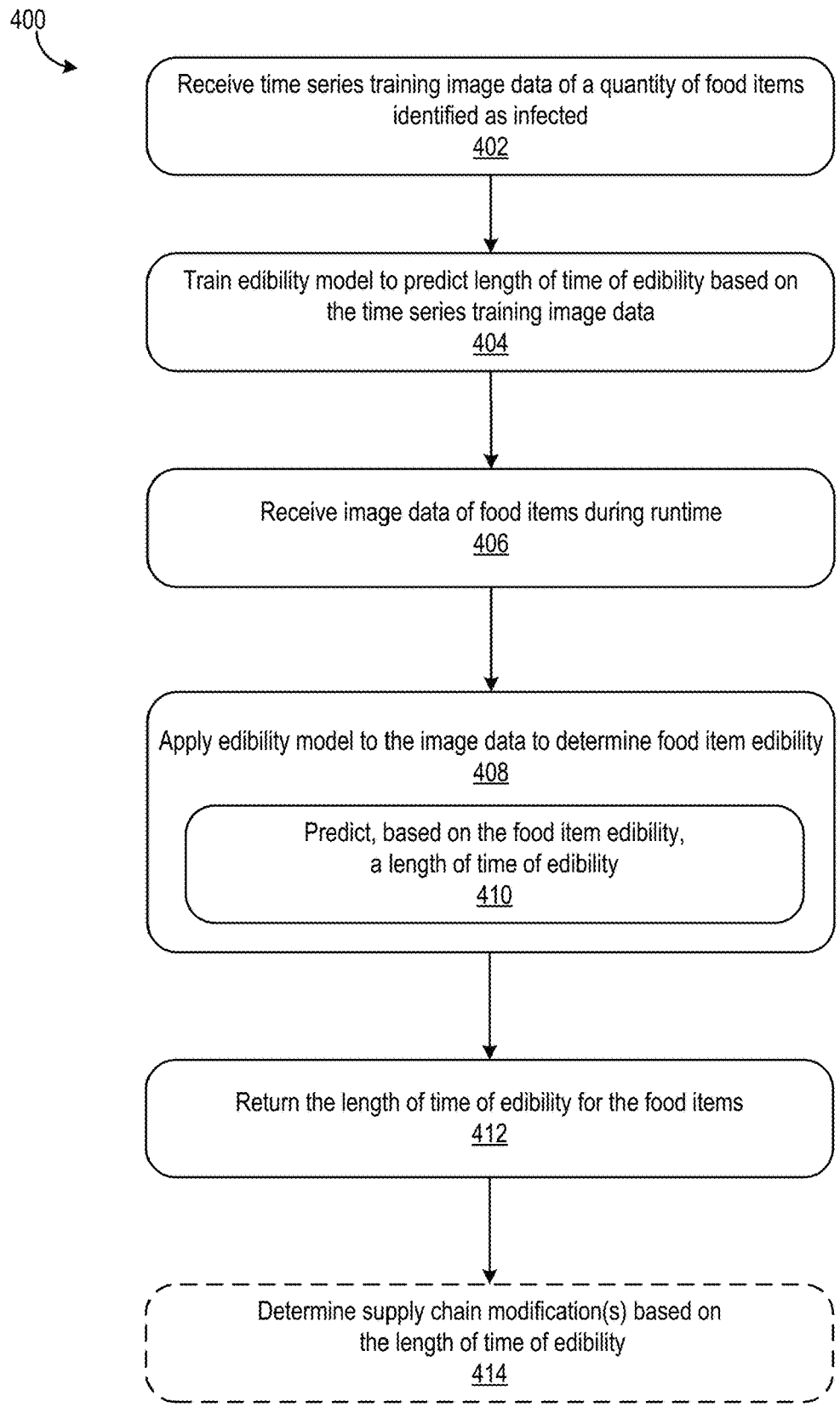
FIG. 4 is a flowchart of a process for determining a length of time of edibility of food items based on their determined quality.

The determination in block 226 can be made for each of the food items in the image data, each of the food items in the image data that have infections, and/or as an aggregate value for the entire batch of food items in the image data. The computer system can apply an edibility model to the image data of the food items that are identified as being infected. The edibility model can be trained to predict the length of time of edibility (e.g., shelf life, consumption, ripeness, etc.) based on the presence of infection, type of infection, spread of infection, percent of infection coverage, and other information about the particular type of food item (e.g., place of origin, transport conditions, historic edibility conditions, historic ripening conditions, etc.). The length of time of edibility can indicate how long the food items remain good for consumption by end consumers. Sometimes, food items that have infection present may still be edible/good for consumption for some period of time following a starting time of the infection. The predicted length of time of edibility can be used by the computer system and/or the relevant stakeholder to determine supply chain modifications to reduce potential waste of the food items. Refer to FIG. 4 for additional discussion about determining the length of time of edibility for the food items.

Blocks 202-212 can be performed at a different time than blocks 214-226 (e.g., with some amount of time passing between blocks 202-212 and blocks 214-226). For example, the blocks 202-212 can be performed during a training phase. The blocks 214-226 can be performed at a later time, as part of runtime use of the model(s) that was generated and trained during the training phase. In some implementations, the blocks 202-212 can be performed followed immediately by the blocks 214-226.

FIGS. 3A-B is a flowchart of a process 300 for determining quality of a food item based on image data. The process 300 can be performed by the computer system 150. The process 300 can also be performed by one or more other computing systems, devices, computers, networks, cloud-based systems, and/or cloud-based services. For illustrative purposes, the process 300 is described from the perspective of a computer system.

Referring to the process 300 in both FIGS. 3A-B, the computer system can receive image data of food items in block 302. Refer to FIGS. 1A, 1C, and 2A-B for further discussion.

In block 304, the computer system can perform object detection techniques to identify a bounding box around each food item in the image data. The computer system can utilize a food item analyzer and/or one or more machine learning models that are trained to identify a food item that appears within a bounding box. CNNs and/or image classification models can be used to positively identify the food item within the bounding box. Each of the returned bounding boxes can be processed in a separate job (e.g., in series). In some implementations, the returned bounding boxes can also be processed in parallel. In some implementations, the computer system can identify the food items ahead of time by analyzing metadata associated with the image data. Sometimes, for example, the metadata can indicate what type of food items appears in the image data. The food item type can then be used by the computer system to retrieve a food item analyzer or other image classification model used for detecting and identifying each of the food item types in image data. Moreover, if a food item does not appear in the image data, then no bounding boxes may be returned for further processing and analysis.

The computer system can determine a grid structure based on the bounding boxes in block 306. The computer system can perform indexing and assign indexes to each of the bounding boxes that make up the grid structure of the image data. Each of the identified food items can receive one of the indexes, which can be used for identifying the food item. To determine the grid structure, the computer system can (1) find what appears to most likely represent rows of food items based on a Y height of the bounding boxes and then (2) sort the entire data frame based on an X position. The grid can be determined, and each bounding box within the grid structure can be assigned an index value, which can be used to identify the food item appearing within the bounding box. One or more machine learning trained models can also be used to determine the grid structure and assign the indexes.

Determining the grid structure and indexing the structure can be advantageous to associate determined quality metrics with the food items appearing in the image data. After all, each food item can have a different quality metric (e.g., healthy, infected, molding, rotting, etc.), so each determined quality metric should be assigned to the index of the corresponding food item. Moreover, assigning the food items the index values can be advantageous to correlate additional metrics and data about the particular food item with the quality metrics determined by the computer system. As a result, the computer system can build more robust and accurate quality metrics for the particular food items in the image data.

In some implementations, the grid structure can also be advantageous to facilitate searching through all image data of food items to identify and/or output food items having particular features and/or quality metrics (e.g., outputting all food items that have a percent infection coverage that exceeds some threshold infection level). This can be beneficial for training the models described herein to more accurately identify and determine quality features of food items. This can also be beneficial for relevant stakeholders in the supply chain who are interested in monitoring the food items, analyzing ROIs, and/or making supply chain adjustments that help reduce or otherwise prevent food item-based waste.

The computer system can select a bounding box for a food item in the image data (block 308). The computer system can select one of the food items depicted in the image data to assess using the model(s) described herein.

The computer system can then apply a clustering model such as a k-means model to the selected bounding box in block 310. The computer system can pass the bounding box portion of the image data through the k-means model that assesses quality of the food item based on pixel data (e.g., color). Although the model is described as a k-means model, the model can also be any other model that is trained with clustering techniques, as described herein. The model can return an indication of whether infection is present in the food item. The computer system can also select one or more additional/other models to apply to the bounding box. The models can be selected based on a type of the food item, user (e.g., stakeholder) preferences, and/or whatever features may be desired for assessment of the food item's quality (e.g., ripeness, firmness, shelf life, edibility, length of time of edibility, etc.). Each model can be executed independently of each other. The models can be executed in series. In some implementations, the models can be executed in parallel.

Executing multiple models in block 310 can be advantageous to generate robust and accurate quality assessments of food items. As an illustrative example, a first model can identify browning on the skin of a fruit. The first model can extract features in the image data indicative of the browning. These extracted features can be provided as input into a second model, which can be trained to identify a ripeness stage of the fruit, further based on the browning. The second model's determination of the fruit's ripeness stage can be provided as input to a third model. The third model can be trained to determine an overall quality metric score for the food item based on the ripeness stage, which was further based on the browning. Thus, more robust and non-invasive quality assessments can be performed. It can be realized that any number of models can be used in any order to perform the quality assessments described herein.

The computer system can determine a quality metric of the food item based on output from the clustering model (block 312). As described in reference to FIGS. 1-2, the computer system can determine whether infection is present in the food item. The computer system can determine a percent of infection coverage for the food item. The computer system can also determine a current edibility of the food item and/or a length of time of edibility (e.g., remaining shelf-life, remaining time for consumption by end-users, etc.) of the food item.

The computer system can also store the quality metric for the food item using the food item's bounding box grid index in block 314. The computer system can associate the quality metric with the grid index that was assigned to the food item. The quality metric can then be stored in a data store or other type of database with this association. The quality metric can be retrieved by the computer system and presented at one or more user devices, as described herein. The quality metric can be used in future analysis and monitoring of the particular food item (or a batch of food items that the particular food item is part of/associated with). In some implementations, the quality metric can also be used in future training datasets to refine and improve accuracy of the k-means model or other models described herein.

In block 316, the computer system can determine whether there are more food items in the image data. For example, the computer system can determine whether there are more indexed bounding boxes in the grid structure that have not yet been assigned quality metrics. In some implementations, the computer system can check the data store to see which grid indexes have been assigned quality metrics to make the determination in block 316.

If there are more food items, then the computer system can return to block 308 and repeat blocks 308-314 for each remaining food item in the image data. If there are no more food items in the image data, the computer system can proceed to block 318.

In block 318, the computer system can output the quality metrics for the food items in the image data. The quality metrics can be presented in a number of ways. For example, the quality metrics can be depicted using images or portions of the image data representing the food items. A food item that is classified as infected can be represented by output that includes a close-up image of bruises or other features on the food item that cause the food item to be of poor quality and thus infected. As another example, the quality metrics can be depicted using spectral graphs. The quality metrics can also be outputted as numeric values, Boolean values, and/or strings, as described herein.

In some implementations, the computer system can output one or more quality metrics for one or more food items based on user preference(s). For example, a user at a user device can provide input to the user device requesting to view quality metrics for a subset of the food items depicted in the image data. The input can also request to view a subset of quality metrics for a particular food item represented in the image data. One or more other user inputs can be used to generate custom/personalized quality metric output(s) for display at the user device.

Optionally, the computer system can determine and return one or more supply chain modifications based on the quality metrics for the food items in the image data (block 320). Modifications can include changing a location where the food items are shipped to, changing an amount of time that the food items are stored, changing storage conditions, applying ripening agents or other treatments to the food items, discarding the food items, moving the food items for shipping to end-consumers, moving the food items for shipping to food processing plants, etc. The supply chain modifications can vary depending on the quality metrics for the food items.

For example, if a food item is classified as infected and/or the percent of infection coverage exceeds a threshold infection level, the computer system can determine that the food item should be shipped to a food processing plant and/or delivered to a grocery store that is geographically closest to a current location of the food item. Such supply chain modifications can reduce possibility of the food item becoming waste. Similarly, if the predicted length of time of edibility for the food item is less than a threshold length of time, the computer system can generate instructions to move the food item, and/or a batch of food items including the food item, to an end-consumer retail environment geographically closest to the current location of the food item so that the food item can be purchased and consumed by end-consumers before it is no longer edible/consumable.

As another example, if a food item is scored as healthy (e.g., good quality, does not include presence of infection, has infection but the infection presence is less than a threshold infection level, etc.), the computer system can determine that the food item can be stored for a longer period of time than other food items, and/or the food item can be shipped to a grocery store that is geographically farther away from the current location of the food item. One or more other modifications can be possible based on what quality metrics are determined for the food item. One or more other modifications can also be possible based on user-designated preferences associated with different quality metrics that are assessed by the model(s) described herein.

FIG. 4 is a flowchart of a process 400 for determining a length of time of edibility of food items based on their determined quality. A food item may still be edible when it has a small amount of infection present (e.g., less than a threshold amount of yellow UV fluorescence is identified in image data of the food item). Therefore, the process 400 can be used to predict how long the food item can last for purchase and consumption since a time at which the infection is detected.

The process 400 can be performed by the computer system 150. The process 400 can also be performed by one or more other computing systems, devices, computers, networks, cloud-based systems, and/or cloud-based services. For illustrative purposes, the process 400 is described from the perspective of a computer system.

Referring to the process 400 in FIG. 4, the computer system can receive time series training image data of a quantity of food items identified as infected in block 402. The image data can be captured at various time points or predetermined periods of time in the lifecycle or supply chain of the quantity of food items. The image data can be captured daily (e.g., once a day) throughout a lifecycle of the quantity of food items. The image data can also be captured at other predetermined time intervals during the lifecycle of the quantity of food items. The image data can be captured in UV light settings. In some implementations, the image data can also be captured in other light settings, such as in visible light conditions.

The computer system can train an edibility model to predict a length of time of edibility of the food items based on the time series training image data (block 404). The time series training image data can demonstrate/track development and/or growth of infection in the food items over time. The time series image data can be labeled at different stages of infection development and/or growth. The different stages of infection development and/or growth can be correlated with other training data indicative of the edibility (e.g., shelf life, freshness, ripeness, readiness for consumption, etc.) of the food items. The other training data can be acquired using destructive techniques, such as cutting open, puncturing, or pushing into the food items. The other training data can also be acquired using destructive techniques with penetrometers and/or durometers. Moreover, the other training data indicative of the edibility of the food items can include taste, freshness, ripeness, firmness, etc. of the food items during the lifecycle of the food items.

The edibility model can then be trained to predict an edibility metric for the food items using the labeled time series training image data and the other training data indicative of the edibility. The model can be trained using machine learning techniques, such as CNNs and/or deep neural networks. The edibility model can also be trained to identify colors in the image data indicative of infection in the food item then correlate those colors with different levels of edibility and/or lengths of time of edibility. For example, image data having at least a threshold quantity of yellow UV fluorescence can represent a food item that has a shorter remaining amount of time of edibility than image data having less than the threshold quantity of yellow UV fluorescence. The yellow UV fluorescence can be correlated with an infection in the food item. The threshold quantity of yellow UV fluorescence in the image data can also vary depending on the type of food item in the image data.

The edibility model can generate output indicating an edibility level of the food items. In some implementations, the model can also generate output indicating a length of time of edibility for the food items. The output can be a numeric, Boolean, and/or string value. For example, the model can generate a score indicating how edible the food items are. The score can be assigned a numeric value on a predetermined scale (e.g., a value on a scale of 1 to 100). A value below a predetermined threshold value (e.g., a value between 1 and 50) can indicate that the food items are less edible or have a shorter length of edibility remaining. A value above the predetermined threshold value (e.g., a value between 51 and 100) can indicate that the food items are edible or have a longer amount of time of edibility remaining. The model can also generate output indicating a predicted amount of time of remaining edibility for the food items. For example, the output can include a number of hours, days, weeks, etc. that the food items are predicted to remain edible and consumable by end consumers.

Once the edibility model is generated and trained, the model can be stored in a data store for retrieval at a later time for runtime use. The edibility model can also be stored in local memory for runtime use at the computer system.

During runtime, the computer system can receive image data of food items in block 406. The food items can be the same type as the food items in the time series training image data. In block 406, the computer system may only receive image data for food items that have been identified as having infection, as described in FIGS. 1-3. The image data can be of one food item. The image data can also be of a batch of food items. In some implementations, the computer system can receive image data for food items, regardless of whether they have been identified yet as having infection or not. Therefore, the process 400 can be performed to determine a length of time of edibility for healthy food items as well as infected food items or food items having other poor quality features.

The computer system can apply the edibility model to the image data to determine food item edibility in block 408. The image data can be provided as input to the edibility model. The edibility model can generate output indicating whether the food item in the image data is edible and/or a predicted length of time of edibility for the food items. Therefore, as part of determining food item edibility, the computer system can predict, based on the food item edibility, a length of time of edibility (block 410). As described above, the prediction can be made using the edibility model. The length of time of edibility can indicate a remaining amount of time that the food item (or batch of food items) in the image data may be consumed by end consumers.

The computer system can return the length of time of edibility for the food items in block 412. The computer system can return the length of time of edibility for an infected food item (e.g., a most infected food item or a food item having a quality metric that satisfies threshold infection criteria, such as percent of infection coverage) in the batch of food items. The computer system can also return an overall/average length of time of remaining edibility for all the food items in the batch. The computer system can also return the length of time of edibility for each infected food item in the image data.

Optionally, the computer system can determine supply chain modifications based on the length of time of edibility of the food item or the batch of food items (block 414). Refer to the process 300 in FIGS. 3A-B for additional discussion about determining the supply chain modifications.

Figure 5A:
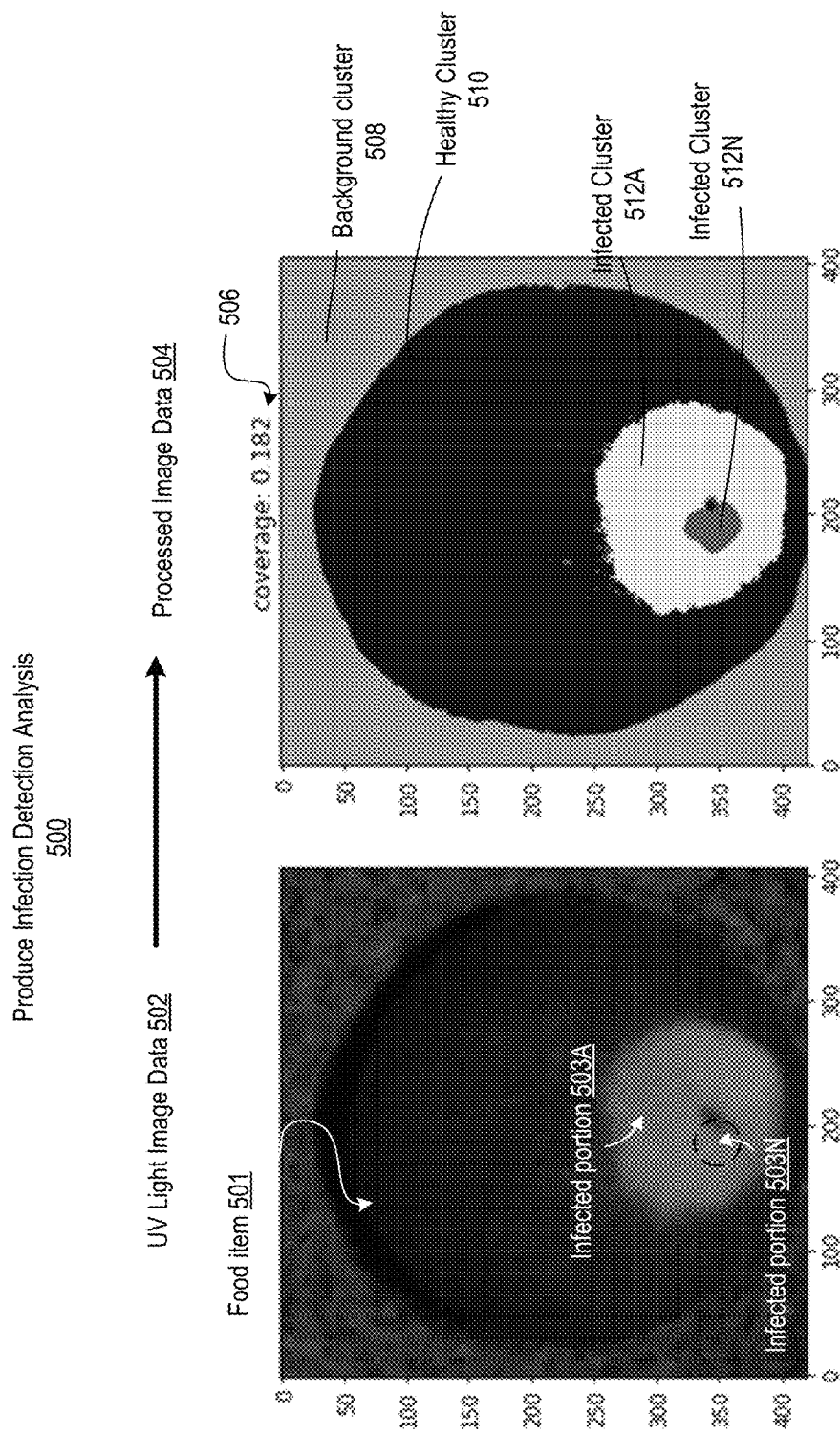
FIG. 5A depicts example infection detection analysis using image data of a food item in UV lighting.

FIG. 5A depicts example infection detection analysis 500 using image data of a food item 501 in UV lighting. In this example, the food item 501 is a mandarin. One or more other food items, such as other citrus fruits, can also be imaged, as described throughout this disclosure. Using the disclosed techniques UV light image data 502 can be captured by an imaging device of the food item 501. The imaging device can capture an image of a batch, pallet, or flat of similar food items 501. The image data 502 can be a cropped, bounding box from the image data of the batch, where the image data 502 depicts one of the food items 501 of the batch. As shown in the image data 502, the UV light conditions cause infected portions 503A and 503N of the food item 501 to fluoresce. The infected portion 503A fluoresces (e.g., in a yellow color) in the image data 502 while the infected portion 503N represents a mold (e.g., in a white color) on the surface of the food item 501. In image data captured in regular, visible light settings, the infected portions 503A and/or 503N may not be as visible or apparent. Instead, the infected portion 503A may, for example, be visible, but the spread of the infected portion 503A across the surface of the food item 501 may not be visibly apparent.

The image data 502 can be processed by a computer system (e.g., the computer system 150) by applying a model (e.g., k-means clustering model, another model using a clustering algorithm, such as Gaussian Mixture Model (GMM)) to identify clusters of pixels representative of various features in the image data 502. Model output can include processed image data 504, in which the features of the image data 502 are clustered and mapped into RGB space. Each cluster in the processed image data 504 can be shown in a color that represents a different feature in the image data 502.

For example, a cluster of pixels 508 can represent a background of the image data 502. Another cluster of pixels 510 can represent healthy features of the food item 501 from the image data 502. Additional clusters of pixels 512A and 512N can represent unhealthy or infected features of the food item 501 from the image data 502, such as the infected portions 503A and 503N, respectively, of the food item 501. In this illustrative example, the cluster 508 can be a green color, the cluster 510 can be a purple color, and cluster 512A can be a yellow color, and the cluster 512N can be a blue color. In some implementations, one or more other different colors can be used to represent the clusters 508, 510, 512A, and/or 512N.

The processed image data 504, as shown in FIG. 5A, provides for a clear visualization of infection in the food item 501. The computer system, as described herein, can also generate an infection coverage metric 506. The infection coverage metric 506 can indicate how much of the food item 501 that is visible in the image data 502 is covered by infection. Each side of the food item 501 can be imaged as described herein to determine overall infection coverage of the entire surface of the food item 501. In some implementations, the computer system described herein can also estimate/measure infection on other sides of the food item 501 that are not visually depicted in the image data 502. For example, the computer system can estimate that another side of the food item 501 (which amounts to the second half of the surface of the food item not shown in the image data) is healthy and thus compute an infection coverage for the full surface of the food item 501.

The infection coverage metric 506 can be outputted or returned with the processed image data 504, for presentation in a GUI display at a user device described herein. The infection coverage metric 506 can be an average of pixels in the infected clusters 512A-N against pixels in both the healthy cluster 510 and the infected clusters 512A-N shown in the processed image data 504. In the example of FIG. 5A, the food item 501 has an infection coverage metric 506 of 0.182. This value can correspond to 18.2% of infection coverage when multiplied by 100 to generate a percentage value. The infection coverage metric 506 can also be presented as a percentage value, as described throughout this disclosure.

The infection coverage metric 506 indicates how much of the surface of the food item 501 is infected. Typically, the metric 506 can be used to extrapolate that an interior of the food item 501 may also be infected, and that more of the interior of the food item 501 may be infected than the external surface of the food item 501. Some infections, such as pathogens (e.g., *Penicillium* sp.), stay near the surface of the food item 501 and thus may not infect as much of the interior of the food item 501. Thus, wound type signals in the image data typically indicate surface damage to the food item 501. On the other hand, latent infections typically move through the interior of the food item 501 and thus spread underneath the surface of the food item 501. Therefore, latent type signals in the image data typically indicate that the food item 501 may also contain some level of internal damage.

Figure 5B:
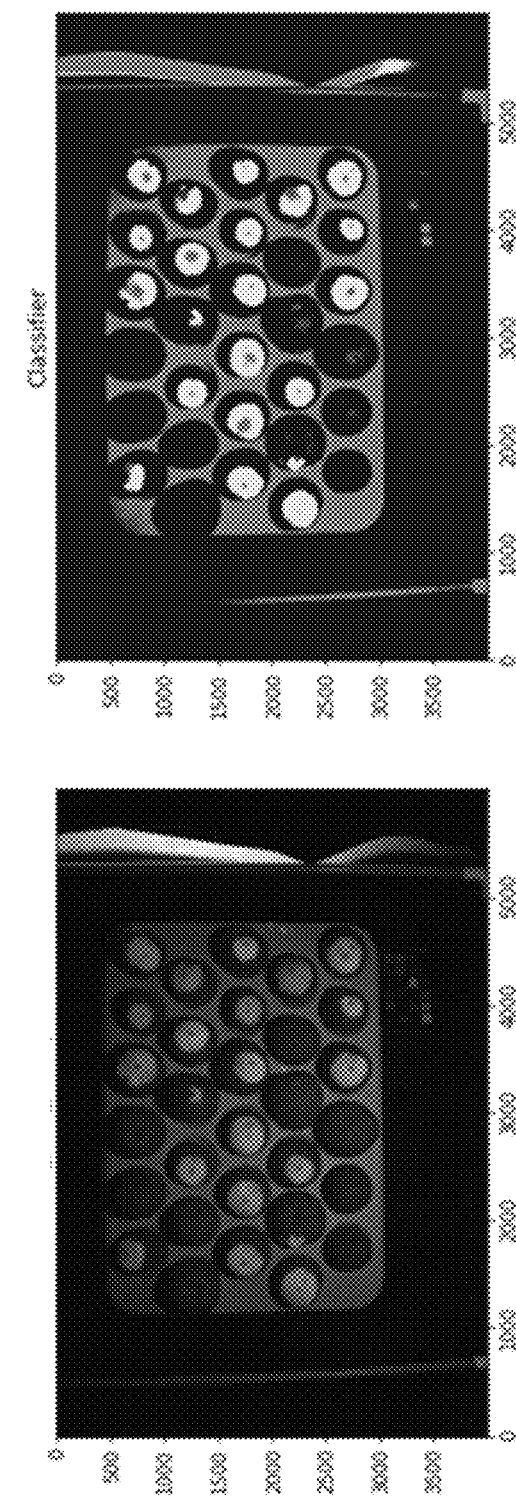
FIG. 5B depicts example infection detection analysis using image data of a batch of food items in UV lighting.

FIG. 5B depicts example infection detection analysis 550 using image data of a batch of food items in UV lighting. Here, image data 552 is captured of a batch of oranges in UV light conditions. As shown, various colors fluoresce in each of the oranges, thereby indicating that each of the oranges may have some amount of infection present. The fluorescing colors can indicate a center point of infection and a spread of infection across a surface of each orange. Processing the image data 552 using the techniques described herein can result in processed image data 554.

Processing the image data 552 includes applying the k-means clustering model, or another model implementing clustering techniques, described herein. The model can generate output such as the processed image data 554, in which clusters of features (e.g., background, healthy portion(s) of food items, infected portion(s) of food items) are mapped into RGB space. Each cluster in the processed image data 554 can be presented in a different color. A computer system as described herein can determine how many of the food items in the processed image data 554 have colors representative of infection. The computer system can also determine, for each food item in the processed image data 554, a percent of infection coverage. Moreover, the computer system can determine or predict a length of edibility for each food item in the processed image data 554 and/or the entire batch of food items in the processed image data 554.

Figure 6:
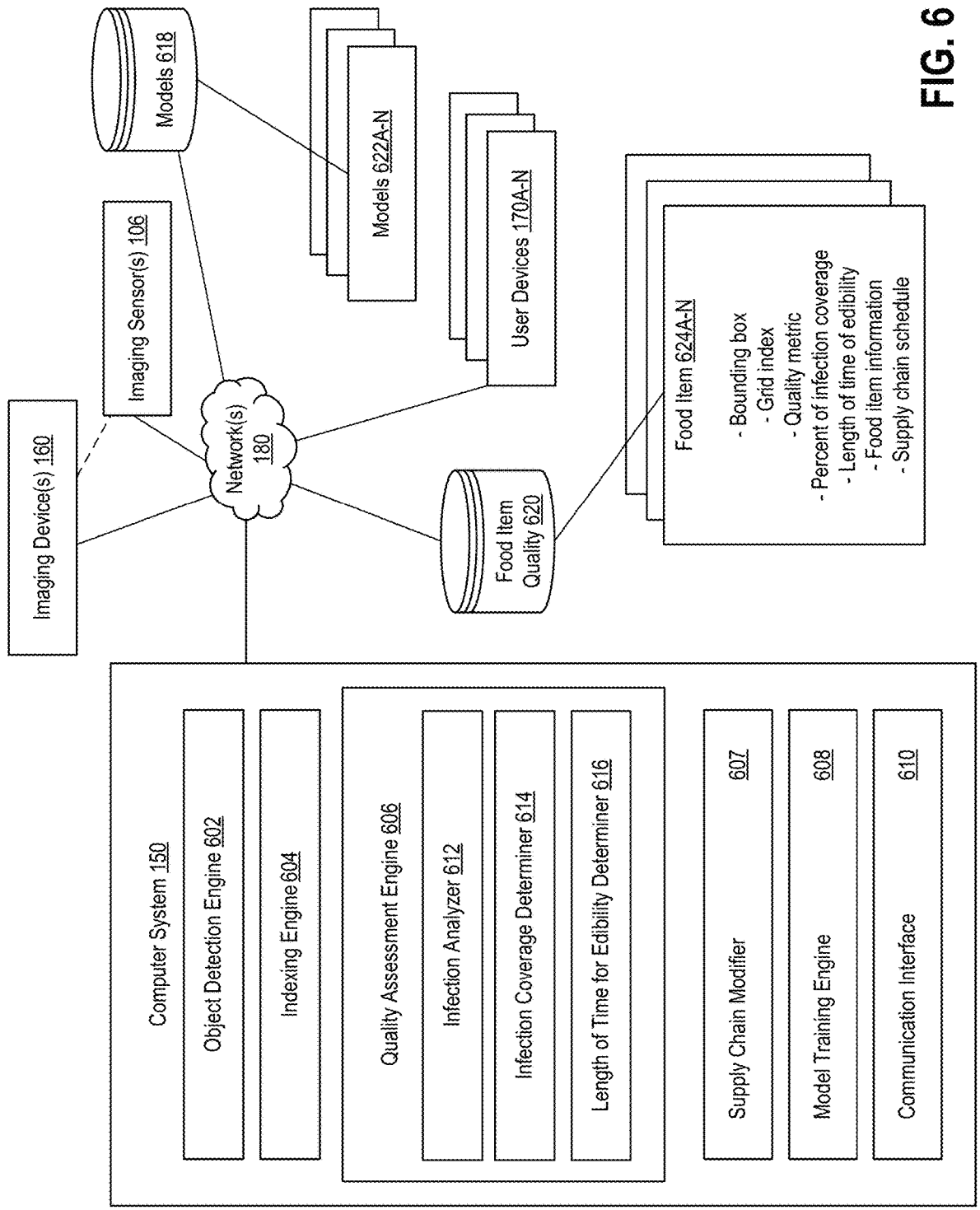
FIG. 6 is an example system diagram of components used for determining food item quality based on the techniques described herein.

FIG. 6 is an example system diagram of components used for determining food item quality based on the techniques described herein. The computer system 150, food item quality data store 620, and models data store 618 can be in communication (e.g., wired and/or wireless) via the network(s) 180.

The computer system 150 can include an object detection engine 602 (e.g., food item identification engine 120 in FIG. 1C, extraction engine 110 in FIG. 1C, and/or a combination of the food item identification engine 120 and the extraction engine 110), an indexing engine 604, a quality assessment engine 606 (e.g., quality assessment system 130, quality evaluation engine 140 in FIG. 1C, or a combination thereof), a supply chain modifier 607, a model training engine 608, and a communication interface 610. The communication interface 610 can provide communication between the components described herein. In some implementations, one or more of the components 602, 604, 606, 607, 608, and 610 can be separate from the computer system 150 and part of one or more other computer systems, computers, servers, devices, and/or networks.

The model training engine 608 can be configured to generate one or more models that can be used by the quality assessment engine 606. The engine 608 can perform the training described herein, for example in FIG. 1B, blocks 202-212 in the process 200 of FIGS. 2A-B, and blocks 402-404 in the process 400 in FIG. 4. The engine 608 can generate models per quality metric/feature and/or per food item type. Although the disclosure describes models for detecting presence of infection and determining edibility of food items, one or more other models can also be generated using the same or similar techniques. The other models can include, but are not limited to, determining browning, rotting, molding, ripening, firmness, taste, acidity level, Brix, size, shape, etc. of various types of food items, such as apples, avocados, berries, cucumbers, oranges, lemons, limes, other citrus fruits, etc.

Models that are generated and trained by the model training engine 608 can be stored in the models data store 618 as models 622A-N. The models 622A-N can be accessed and/or retrieved by one or more analyzers of the quality assessment engine 606 during runtime. Only some of the models 622A-N can be selected during runtime, based on a type of food item in the image data and/or user preferences for quality assessment of the particular food item(s) in the image data. The models 622A-N can also be updated or otherwise modified based on runtime application of the models to image data.

The object detection engine 602 can be configured to detect one or more food items in image data, as described herein, such as in block 304 in the process 300 of FIGS. 3A-B. The engine 602 can receive the image data and perform object detection techniques to process the image data. The engine 602 can also apply one or more machine learning-trained models that are trained to identify any type of food item or a particular type of food items in the image data. The engine 602 can generate bounding boxes around each of the food items in the image data. For each food item 624A-N, the engine 602 can store the bounding box image of the food item in the food item quality data store 620.

In some implementations, the object detection engine 602 can calibrate colors in bounding box portions of the image data to maintain color consistency throughout the image data. Color calibration can also be performed by a separate engine, such as a color calibration engine (not depicted). Color calibration can be applied to the full image data as a preprocessing step before object detection and/or object extraction. Once the image data is calibrated based on color, RGB image analysis as described throughout this disclosure can be performed.

The indexing engine 604 can be configured to apply a grid structure to the image data and index each bounding box in the structure, as described herein, such as in block 306 in the process 300 of FIGS. 3A-B. Each bounding box can encompass a food item that is represented in the image data. For each food item 624A-N, the engine 604 can retrieve the bounding box image from the food item quality data store 620 and assign the index value to the bounding box. Thus, each food item can be identified by the assigned grid index, which can be beneficial for future retrieval of information, analysis, and processing operations. For each food item 624A-N, the engine 604 can store the grid index in the food item quality data store 620.

The quality assessment engine 606 can be configured to identify one or more features indicating quality of the food items represented in the image data. As described herein, the engine 606 can determine presence of infection in the image data. One or more other quality assessment engines can also be part of the computer system 150. Each quality assessment engine, such as the quality assessment engines 132A-N in FIG. 1C, can be configured to determine a different quality feature of the food items. For example, the engine 606 can determine infection presence for any type of food item, another engine can determine infection presence for oranges, another engine can determine ripeness of avocados, another engine can determine firmness of avocados, another can be a general color analyzer for any type of food item, another can be a size analyzer, another engine can be a color analyzer for apples, another can be a taste and/or juiciness analyzer for oranges, etc. As another illustrative example, one or more quality assessment engines can include a color analyzer, an apple yellowing analyzer, a lime yellowing analyzer, an avocado internal analyzer, a lime rot and desiccation analyzer, a shelf life analyzer, a produce grade analyzer, a size analyzer, a shape analyzer, a ripening coating analyzer, a dry matter analyzer, a firmness analyzer, a Brix analyzer, a nutrition analyzer, a sticker analyzer, an acid analyzer, a generic internal defect analyzer, and/or a generic color analyzer. One or more additional analyzers can include a wrinkling analyzer (e.g., for mangos) and/or a Lenticel Oxidation (black spot) analyzer (e.g., for mangos). Outputs from any one or more of the analyzers can be stored, for each food item 650A-N as quality metrics (or quality scores) for the respective food item 624A-N in the food item quality data store 620. In some implementations, outputs from any one or more of the quality assessment engines can be received as input into one or more of the other quality assessment engines executed by the computer system 150 to determine overall quality of the particular food item or the batch of food items containing the particular food item.

In FIG. 6, the quality assessment engine 606 can retrieve the bounding box image for each food item 624A-N from the food item quality data store 620. In some implementations, the engine 606 can receive the bounding box images of the food items from the object detection engine 602. In some implementations, the engine 606 can retrieve the image data of the batch of food items directly from an imaging device or imaging sensor, such as the imaging device 160 described in FIG. 1A and/or the imaging sensor 106 described in FIG. 1C.

The bounding box of the food item can be processed by the infection analyzer 612. The infection analyzer 612 can be configured to determine whether infection is present in the food item. The analyzer 612 can also determine whether infection is present in the batch of food items based on analyzing the bounding box for each food item in the batch of food items. The analyzer 612 can retrieve one or more models 622A-N from the models data store 618 to execute during runtime. For example, the analyzer 612 can retrieve the model for detecting presence of infection described throughout this disclosure. The analyzer 612 can also select the model from the models data store 618 based on a food item type identification made by the object detection engine 602 and/or metadata associated with the retrieved bounding box of the food item (e.g., food item information for the respective food items 624A-N in the food item quality data store 620, which can include place of origin, geographic conditions of growth, transport conditions, typical/historic ripening conditions, typical/historic growth conditions, food item type, etc.). The analyzer 612 can apply the model to determine whether infection is present in the food item, as described in FIG. 1A, blocks 216-218 in the process 200 of FIGS. 2A-B, and blocks 310-314 in the process 300 of FIG. 3. A determination made by the analyzer 612 can also be stored for the respective food item 624A-N in the food item quality data store 620. The determination can be a quality metric, as described herein.

The quality assessment engine 606 can have an infection coverage determiner 614, which can be configured to determine how much of the food item in the bounding box is covered by the infection that was detected by the infection analyzer 612. The determiner 614 can generate a percentage value indicating infection coverage for the particular food item, as described in reference to block 222 in the process 200 of FIGS. 2A-B and block 312 in the process 300 of FIGS. 3A-B. The determiner 614 can also generate one or more other values, such as string, Boolean, and/or numeric values indicating how much of the food item is covered by/includes the infection. The percent of infection coverage, or other value of infection coverage, can be stored for each food item 624A-N in the food item quality data store 620.

The quality assessment engine 606 can also have a length of time of edibility determiner 616, which can be configured to determine a current edibility (e.g., consumption rating) and/or predict a remaining length of time that the food item in the bounding box can be consumed/edible by end-consumers. The determiner 616 can also predict, in some implementations, shelf life and/or ripeness of the food item. Moreover, the determiner 616 can predict overall length of time of edibility for the batch of food items containing the particular food item in the bounding box. Refer to the process 400 in FIG. 4 for additional discussion about determining the length of time of edibility. The length of time of edibility can then be stored for each food item 624A-N in the food item quality data store 620.

Finally, the quality assessment engine 606 can generate output about the quality of the food item that was analyzed by the components 612, 614, and 616. The engine 606 can also generate output about overall quality of the batch of food items containing the particular food item that was analyzed. The output can be transmitted to the user device(s) 170 depicted and described in FIG. 1A.

The supply chain modifier 607 can be configured to determine one or more supply chain modifications for the particular food item or the batch of food items based on the quality metrics determined by the quality assessment engine 606. The modifier 607 can receive the quality metrics (e.g., infection presence, infection coverage, and/or length of time of edibility) from the quality assessment engine 606 (or retrieve them from the food item data record 624A-N in the food item quality data store 620) as well as a supply chain schedule for the particular food item 624A-N from the food item quality data store 620. The modifier 607 can then determine one or more modifications to the supply chain schedule based on the quality metrics, where the modifications can ensure reduced or otherwise eliminated waste of the particular food item. Refer to FIG. 1A, block 320 in the process 300 of FIGS. 3A-B, and block 414 in the process 400 of FIG. 4 for additional discussion about determining supply chain modifications. Any modifications or updates to the supply chain schedule can then be stored for the respective food item 624A-N in the food item quality data store 620.

Figure 7:
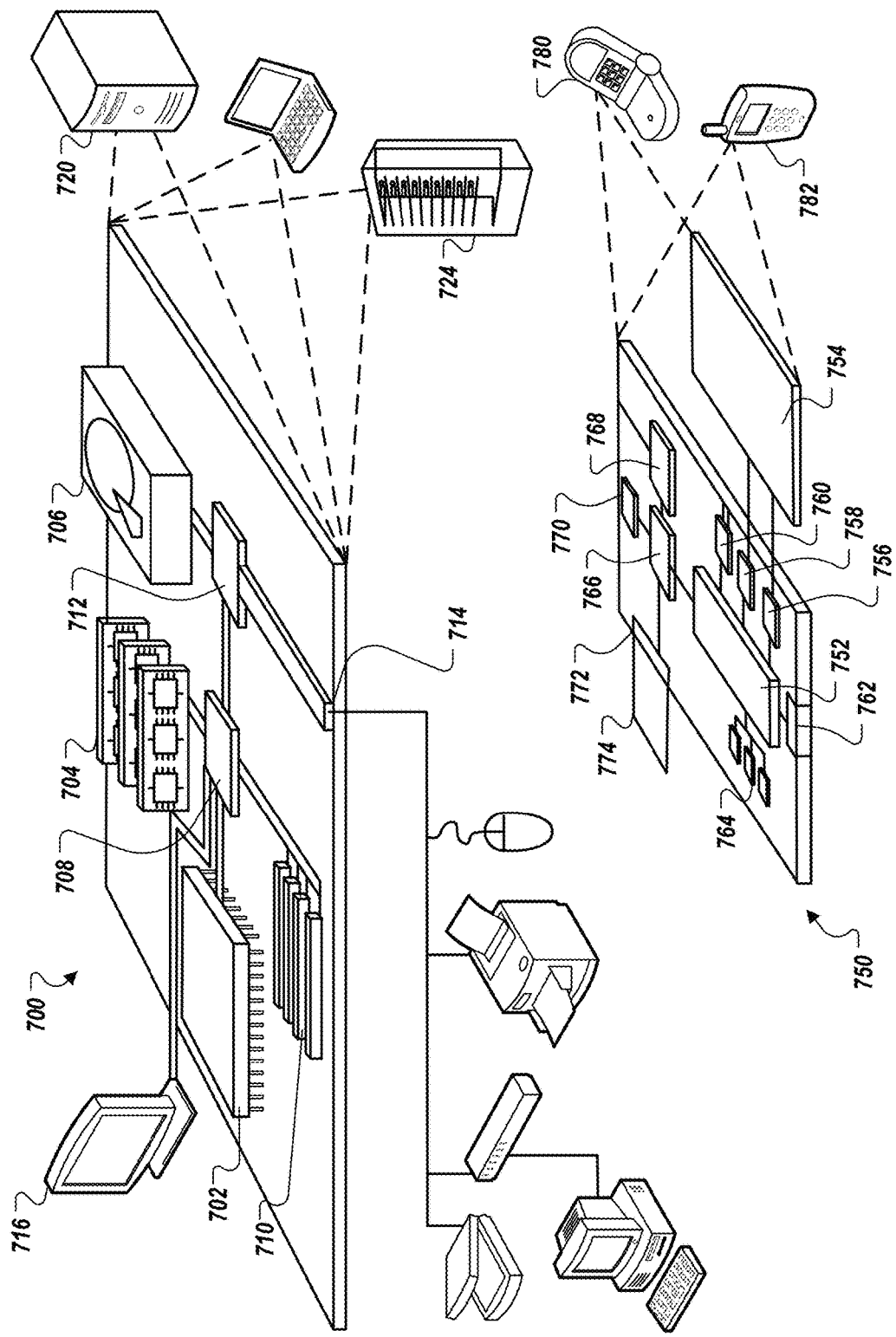
FIG. 7 is a schematic diagram that shows an example of a computing device and a mobile computing device.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provide as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for determining infection presence in food items using image data, the method comprising:
    receiving, by a computing system and from an imaging device, image data of food items under UV light;
    determining, by the computing system, an infection presence metric for each of the food items by applying a model to the image data, wherein applying the model to the image data comprises:
        applying a grid structure to the image data to assign each food item in the image data a respective grid index that identifies a placement of the food item in the grid structure;
    wherein the model was trained using image training data of other food items under UV light, wherein the image training data comprises a grid of other food items, each other food item assigned a respective grid index, the image training data being annotated based on previous identifications of a first portion of the other food items as having infection features and a second portion of the other food items as having healthy quality features, wherein the other food items are of a same food type as the food items;
    identifying, by the computing system and using the respective grid indices, an infected group of the food items in the image data as having respective infection presence metrics that satisfy a threshold infection level, the threshold infection level indicating that the food items are infected based on the first portion and the second portion; and
    returning, by the computing system, the infected group of the food items in the image data as having respective infection presence metrics and the infection presence metric for the food items in the image data.

2. The method of claim 1, further comprising:
    determining, by the computing system and based on the infection presence metrics for the food items, an infection coverage metric for each of the food items; and
    returning, by the computing system, the infection coverage metric for the food items in the image data.

3. The method of claim 2, wherein the infection coverage metric for each food item is a percentage of a surface of the food item that includes features indicative of the infection.

4. The method of claim 1, wherein returning, by the computing system, the infection presence metric for the food items in the image data comprises transmitting the infection presence metric to a user device for presentation in a GUI display at the user device.

5. The method of claim 1, wherein the infection presence metric for each food item is a string value indicating a healthy food item or an infected food item.

6. The method of claim 1, further comprising:
    determining, by the computing system, an edibility metric for the group of food items by applying an edibility model to the image data, wherein the edibility model was trained using training time series image data of infected food items, the training time series image data being annotated with previous identifications of infection surface coverage correlating to lengths of time of edibility of the infected food items, wherein the infected food items are of the same food type as the food items; and
    returning, by the computing system, the edibility metric for the group of food items.

7. The method of claim 6, wherein determining, by the computing system, the edibility metric for the group of food items comprises predicting a length of time of edibility for the group of food items.

8. The method of claim 1, further comprising
    retrieving, by the computing system, from a data store, and for each of the food items, the infection presence metric for the food item;
    identifying, by the computing system, supply chain information for the food item that includes a preexisting supply chain schedule and destination for the food item;
    determining, by the computing system, whether to modify the supply chain information for the food item based on the infection presence metric;
    in response to a determination to modify the supply chain information, generating, by the computing system, modified supply chain information based on the infection presence metric, wherein the modified supply chain information includes one or more of a modified supply chain schedule and modified destination for the food item; and
    transmitting, by the computing system, the modified supply chain information to one or more supply chain actors to implement the modified supply chain information.

9. The method of claim 8, wherein determining, by the computing system, whether to modify the supply chain information for the food item based on the infection presence metric comprises determining that the infection presence metric satisfies the threshold infection level.

10. A system for determining infection presence in food items using image data, the system comprising:
    at least one light source configured to illuminate food items of a same food type, wherein the at least one light source emits ultra-violet (UV) light;
    one or more imaging devices configured to capture image data for the food items when the food items are illuminated by the at least one light source; and
    at least one computing system in communication with the one or more imaging devices, the at least one computing system configured to:
        receive, by a computing system and from an imaging device, image data of food items under UV light;
        determine, by the computing system, an infection presence metric for each of the food items by applying a model to the image data, wherein applying the model to the image data comprises:
applying a grid structure to the image data to assign each food item in the image data a respective grid index that identifies a placement of the food item in the grid structure;
wherein the model was trained using image training data of other food items under UV light, wherein the image training data comprises a grid of other food items, each other food item assigned a respective grid index, the image training data being annotated based on previous identifications of a first portion of the other food items as having infection features and a second portion of the other food items as having healthy quality features, wherein the other food items are of a same food type as the food items;
identify, by the computing system and using the respective grid indices, an infected group of the food items in the image data as having respective infection presence metrics that satisfy a threshold infection level, the threshold infection level indicating that the food items are infected based on the first portion and the second portion; and
return, by the computing system, the infected group of the food items in the image data as having respective infection presence metrics and the infection presence metric for the food items in the image data.

11. The system of claim 10, wherein the at least one computing system is further configured to:
determine, by the computing system and based on the infection presence metrics for the food items, an infection coverage metric for each of the food items; and
return, by the computing system, the infection coverage metric for the food items in the image data.

12. The system of claim 11, wherein the infection coverage metric for each food item is a percentage of a surface of the food item that includes features indicative of the infection.

13. The system of claim 10, wherein returning, by the computing system, the infection presence metric for the food items in the image data comprises transmitting the infection presence metric to a user device for presentation in a GUI display at the user device.

14. The system of claim 10, wherein the infection presence metric for each food item is a string value indicating a healthy food item or an infected food item.

15. The system of claim 10, wherein the at least one computing system is configured to:
determine, by the computing system, an edibility metric for the group of food items by applying an edibility model to the image data, wherein the edibility model was trained using training time series image data of infected food items, the training time series image data being annotated with previous identifications of infection surface coverage correlating to lengths of time of edibility of the infected food items, wherein the infected food items are of the same food type as the food items; and
return, by the computing system, the edibility metric for the group of food items.

16. A non-transitory computer-readable medium encoding instructions operable to cause data processing apparatus to perform operations comprising:
receiving, by a computing system and from an imaging device, image data of food items under UV light;
determining, by the computing system, an infection presence metric for each of the food items by applying a model to the image data, wherein applying the model to the image data comprises:
applying a grid structure to the image data to assign each food item in the image data a respective grid index that identifies a placement of the food item in the grid structure;
wherein the model was trained using image training data of other food items under UV light, wherein the image training data comprises a grid of other food items, each other food item assigned a respective grid index, the image training data being annotated based on previous identifications of a first portion of the other food items as having infection features and a second portion of the other food items as having healthy quality features, wherein the other food items are of a same food type as the food items;
identifying, by the computing system and using the respective grid indices, an infected group of the food items in the image data as having respective infection presence metrics that satisfy a threshold infection level, the threshold infection level indicating that the food items are infected based on the first portion and the second portion; and
returning, by the computing system, the infected group of the food items in the image data as having respective infection presence metrics and the infection presence metric for the food items in the image data.

17. The non-transitory computer-readable medium of claim 16, further comprising instructions operable to cause data processing apparatus to perform operations comprising:
determining, by the computing system and based on the infection presence metrics for the food items, an infection coverage metric for each of the food items; and
returning, by the computing system, the infection coverage metric for the food items in the image data.

18. The non-transitory computer-readable medium of claim 17, wherein the infection coverage metric for each food item is a percentage of a surface of the food item that includes features indicative of the infection.

19. The non-transitory computer-readable medium of claim 16, wherein returning, by the computing system, the infection presence metric for the food items in the image data comprises transmitting the infection presence metric to a user device for presentation in a GUI display at the user device.

20. The non-transitory computer-readable medium of claim 16, wherein the infection presence metric for each food item is a string value indicating a healthy food item or an infected food item.

* * * * *